US007337360B2

(12) United States Patent
Shen et al.

(10) Patent No.: US 7,337,360 B2
(45) Date of Patent: *Feb. 26, 2008

(54) STORED MEMORY RECOVERY SYSTEM

(75) Inventors: Andrew W. Shen, Dallas, TX (US); Hanxiang Sun, Vista, CA (US); Zhang Jian, Nanjing (CN); Janet Vohariwatt, San Diego, CA (US); Timothy John Murray, Valley Center, CA (US)

(73) Assignee: Idocrase Investments LLC, Las Vegas, NV (US)

( * ) Notice: Subject to any disclaimer, the term of this patent is extended or adjusted under 35 U.S.C. 154(b) by 570 days.

This patent is subject to a terminal disclaimer.

(21) Appl. No.: 10/460,778

(22) Filed: Jun. 11, 2003

(65) Prior Publication Data
US 2004/0153718 A1    Aug. 5, 2004

Related U.S. Application Data

(63) Continuation-in-part of application No. 09/420,348, filed on Oct. 19, 1999, now Pat. No. 6,594,780.

(60) Provisional application No. 60/424,356, filed on Nov. 5, 2002, provisional application No. 60/459,927, filed on Mar. 31, 2003.

(51) Int. Cl.
G06F 11/00    (2006.01)
(52) U.S. Cl. .......................................... 714/20; 711/163
(58) Field of Classification Search .................... 714/8, 714/15, 19–20; 711/152, 163, 202, 208, 711/209, 221; 707/702
See application file for complete search history.

(56) References Cited

U.S. PATENT DOCUMENTS

| | | | |
|---|---|---|---|
| 4,683,532 A | 7/1987 | Yount et al. | |
| 4,819,156 A | 4/1989 | DeLorme et al. | |
| 4,937,736 A * | 6/1990 | Chang et al. | 711/208 |
| 4,951,249 A | 8/1990 | McClung et al. | |
| 4,975,950 A | 12/1990 | Lentz | |
| 5,008,786 A | 4/1991 | Thatte | |
| 5,012,514 A | 4/1991 | Renton | |
| 5,109,413 A | 4/1992 | Comerford et al. | |
| 5,175,850 A | 12/1992 | Hirata et al. | |
| 5,210,866 A * | 5/1993 | Milligan et al. | 714/6 |
| 5,263,140 A * | 11/1993 | Riordan | 711/207 |
| 5,313,611 A * | 5/1994 | Franklin et al. | 711/206 |
| 5,325,499 A * | 6/1994 | Kummer et al. | 711/143 |
| 5,325,519 A | 6/1994 | Long et al. | |
| 5,379,391 A * | 1/1995 | Belsan et al. | 711/114 |
| 5,404,361 A * | 4/1995 | Casorso et al. | 714/767 |
| 5,410,667 A * | 4/1995 | Belsan et al. | 711/114 |
| 5,475,827 A * | 12/1995 | Lee et al. | 711/207 |
| 5,479,611 A | 12/1995 | Oyama | |
| 5,487,160 A * | 1/1996 | Bemis | 711/114 |
| 5,517,632 A * | 5/1996 | Matsumoto et al. | 711/114 |
| 5,594,793 A * | 1/1997 | Bahout | 713/193 |
| 5,640,507 A | 6/1997 | Lipe | |
| 5,642,417 A | 6/1997 | Stringer | |
| 5,649,152 A * | 7/1997 | Ohran et al. | 711/114 |
| 5,652,646 A | 7/1997 | Murayama et al. | |
| 5,652,854 A * | 7/1997 | Wong | 711/206 |
| 5,673,407 A | 9/1997 | Poland et al. | |
| 5,679,944 A | 10/1997 | Cusey et al. | |
| 5,680,482 A | 10/1997 | Liu et al. | |
| 5,682,494 A * | 10/1997 | Yokomizo | 711/5 |
| 5,712,998 A * | 1/1998 | Rosen | 711/205 |
| 5,745,752 A | 4/1998 | Hurvig et al. | |
| 5,752,005 A | 5/1998 | Jones | |
| 5,752,268 A | 5/1998 | Shimizu et al. | |
| 5,754,817 A * | 5/1998 | Wells et al. | 711/203 |
| 5,761,680 A | 6/1998 | Cohen et al. | |
| 5,768,582 A | 6/1998 | Korenshtein | |
| 5,768,617 A | 6/1998 | Liu | |
| 5,809,546 A * | 9/1998 | Greenstein et al. | 711/164 |
| 5,832,513 A | 11/1998 | Kennedy | |
| 5,832,515 A | 11/1998 | Ledain et al. | |
| 5,835,722 A | 11/1998 | Bradshaw et al. | |
| 5,848,420 A | 12/1998 | Xu | |

(Continued)

FOREIGN PATENT DOCUMENTS

JP    363005451    1/1988

(Continued)

OTHER PUBLICATIONS

Ron White, How Computers Work, Sep. 1999, QUE, Millennium Edition, pp. 146-147.

(Continued)

*Primary Examiner*—Robert Beausoliel
*Assistant Examiner*—Elmira Mehrmanesh

(57) ABSTRACT

Various embodiments of systems and methods for preserving saved memory states to which a computer system can be restored are disclosed. In certain embodiments, the systems and methods intercept write operations to protected memory locations and redirect them to alternate memory locations. Embodiments of the systems and methods include creation of a table for each memory state. Certain embodiments additionally include a recovery capability, by which the protected memory in the computer system is capable of being restored or recovered to a recovery point that represents a saved memory state. Further embodiments relate to systems and methods for preventing protected memory locations from being overwritten that utilize a plurality of memory state values.

62 Claims, 15 Drawing Sheets

U.S. PATENT DOCUMENTS

| | | | |
|---|---|---|---|
| 5,873,127 A * | 2/1999 | Harvey et al. ............... 711/206 |
| 5,881,221 A | 3/1999 | Hoang et al. |
| 5,881,282 A | 3/1999 | Shipman |
| 5,924,102 A | 7/1999 | Perks |
| 5,943,689 A * | 8/1999 | Tamer ........................ 711/166 |
| 5,951,681 A | 9/1999 | Chang |
| 5,960,084 A | 9/1999 | Angelo |
| 5,991,402 A | 11/1999 | Jia et al. |
| 5,991,856 A | 11/1999 | Spilo et al. |
| 6,016,553 A * | 1/2000 | Schneider et al. ............. 714/21 |
| 6,038,639 A * | 3/2000 | O'Brien et al. ............. 711/114 |
| 6,061,773 A * | 5/2000 | Harvey et al. ............... 711/206 |
| 6,067,582 A | 5/2000 | Smith et al. |
| 6,067,622 A | 5/2000 | Moore |
| 6,081,875 A | 6/2000 | Clifton et al. |
| 6,085,296 A * | 7/2000 | Karkhanis et al. .......... 711/147 |
| 6,110,228 A | 8/2000 | Albright et al. |
| 6,141,771 A * | 10/2000 | O'Brien et al. ............... 714/15 |
| 6,167,494 A | 12/2000 | Cheston et al. |
| 6,173,291 B1 | 1/2001 | Jenevein |
| 6,173,417 B1 | 1/2001 | Merrill |
| 6,173,446 B1 | 1/2001 | Khan et al. |
| 6,175,904 B1 | 1/2001 | Gunderson |
| 6,189,146 B1 | 2/2001 | Misra et al. |
| 6,199,178 B1 | 3/2001 | Schneider et al. |
| 6,205,527 B1 | 3/2001 | Goshey et al. |
| 6,205,558 B1 | 3/2001 | Sobel |
| 6,212,635 B1 | 4/2001 | Reardon |
| 6,226,747 B1 | 5/2001 | Larsson et al. |
| 6,226,759 B1 | 5/2001 | Miller et al. |
| 6,230,285 B1 | 5/2001 | Sadowsky et al. |
| 6,240,527 B1 | 5/2001 | Schneider et al. |
| 6,240,531 B1 | 5/2001 | Spilo et al. |
| 6,243,833 B1 | 6/2001 | Hitchcock et al. |
| 6,247,109 B1 | 6/2001 | Kleinsorge et al. |
| 6,275,942 B1 | 8/2001 | Bernhard et al. |
| 6,289,426 B1 | 9/2001 | Maffezzoni et al. |
| 6,338,149 B1 | 1/2002 | Ciccone et al. |
| 6,345,346 B1 | 2/2002 | Biessener et al. |
| 6,356,915 B1 | 3/2002 | Chtchetkine et al. |
| 6,363,400 B1 | 3/2002 | Chtchetkine et al. |
| 6,366,988 B1 | 4/2002 | Skiba et al. |
| 6,374,265 B1 | 4/2002 | Chen et al. |
| 6,449,111 B1 | 9/2002 | Kool et al. |
| 6,549,997 B2 * | 4/2003 | Kalyanasundharam ...... 711/207 |
| 6,681,346 B2 * | 1/2004 | James et al. ................... 714/42 |
| 6,721,764 B2 * | 4/2004 | Hitz et al. ................... 707/202 |
| 6,804,766 B1 * | 10/2004 | Noel et al. ................... 711/203 |
| 6,901,479 B2 * | 5/2005 | Tomita ........................ 711/114 |
| 7,185,227 B2 * | 2/2007 | Eguchi et al. ................. 714/15 |
| 7,206,961 B1 * | 4/2007 | Mutalik et al. ................. 714/6 |
| 2002/0019907 A | 7/1998 | McMurdie et al. |
| 2002/0023199 A1 | 2/2002 | Biessener et al. |
| 2002/0049883 A1 | 4/2002 | Schneider et al. |
| 2005/0076176 A1 * | 4/2005 | Takada et al. ............... 711/112 |

FOREIGN PATENT DOCUMENTS

| | | |
|---|---|---|
| WO | WO 99/12101 | 3/1999 |
| WO | WO 00/65447 | 11/2000 |

OTHER PUBLICATIONS

Microsoft Press Computer Dictionary, 1997, Microsoft Press, Third Edition, pp. 495 and 498.

"Troubleshooting Video Problems in Windows (Q127139)," May 30, 1996, Microsoft <http://support.microsoft.com/default.aspx?scid=kb;EN-US;q127139> [accessed Jun. 5, 2002].

Ben Ezzell and Jin Blaney, "Windows 98 Developer's Handbook," 1998, Sybex, Inc., ch. 19.

"Beaconing Significant Desktop Objects," Apr. 1, 1995, IBM Technical Disclosure Bulletin, Apr. 1995, US, 38:4, pp. 437-438.

* cited by examiner

Fig. 2
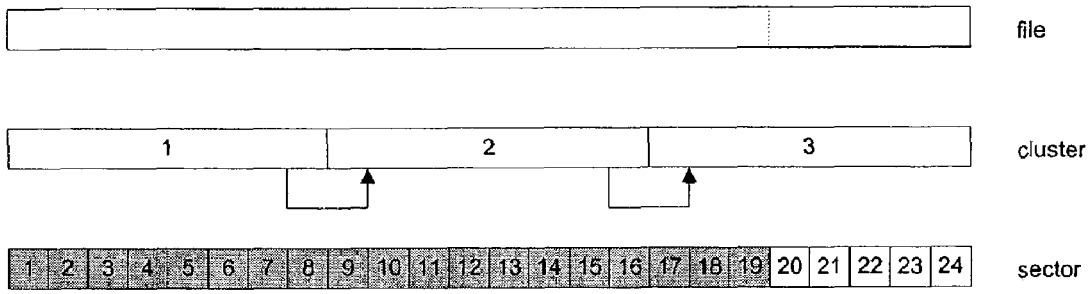
Fig. 3
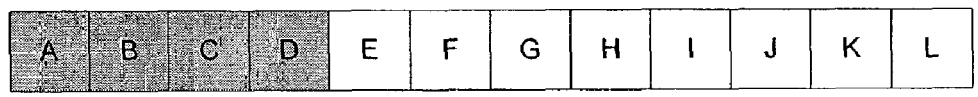
Fig. 4
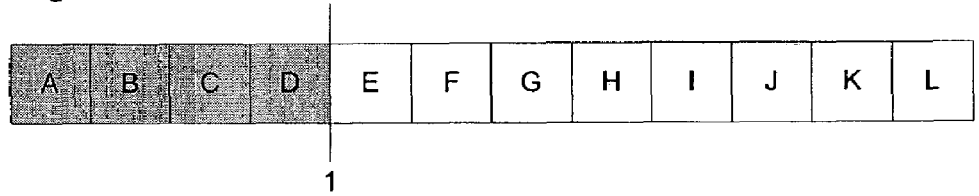
Fig. 5
| TYPE / FLAG | SECTORS | 1 |
|---|---|---|
| Already_Used (AU) | A B C D | |
| RS_Free (RSF) | E F G H I J K L | |
| RS_Used (RSU) | | |
| Newly_Used (NU) | | |
| Current_Redirected (CR) | | |
| Previous_Redirected (PR) | | |

Fig. 8
800 Write request to E
| Flag | Sectors | 1 |
|---|---|---|
| AU | B C D | |
| RSF | G H I J K L | |
| RSU | E | |
| NU | F | |
| CR | A=>E | |
| PR | | |
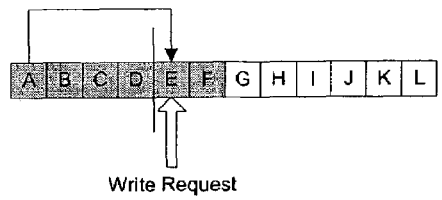
Write Request
↓ RS_Used
804 Find RS_Free sector
| Flag | Sectors | 1 |
|---|---|---|
| AU | B C D | |
| RSF | G H I J K L | |
| RSU | E | |
| NU | F | |
| CR | A=>E | |
| PR | | |
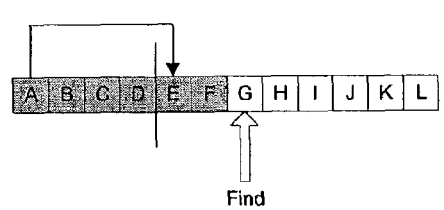
Find
↓ Sector G
806 Flag G as RS_Used
| Flag | Sectors | 1 |
|---|---|---|
| AU | B C D | |
| RSF | H I J K L | |
| RSU | E G | |
| NU | F | |
| CR | A=>E | |
| PR | | |
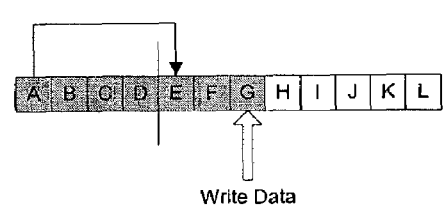
Write Data
808 Write data to G
810 Flag E as Current_Redirected
| Flag | Sectors | 1 |
|---|---|---|
| AU | B C D | |
| RSF | H I J K L | |
| RSU | G | |
| NU | F | |
| CR | A=>E  E=>G | |
| PR | | |
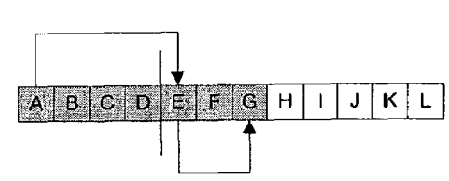
812 Update E => G

Fig. 9
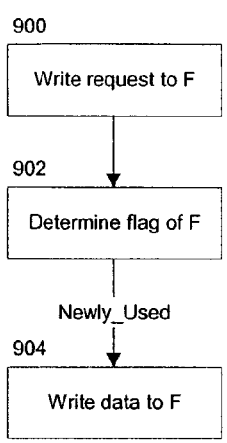
900 Write request to F
902 Determine flag of F
↓ Newly_Used
904 Write data to F
| Flag | Sectors | 1 |
|------|---------|---|
| AU   | B C D   |   |
| RSF  | H I J K L |   |
| RSU  | G       |   |
| NU   | F       |   |
| CR   | A=>E E=>G |   |
| PR   |         |   |
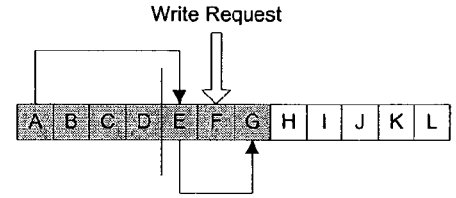
| Flag | Sectors | 1 |
|------|---------|---|
| AU   | B C D   |   |
| RSF  | H I J K L |   |
| RSU  | G       |   |
| NU   | F       |   |
| CR   | A=>E E=>G |   |
| PR   |         |   |
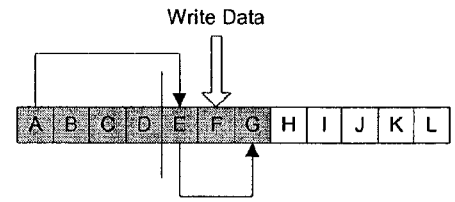

| TYPE / FLAG | SECTORS | 2 |
|---|---|---|
| Already_Used (AU) | B C D F | |
| RS_Free (RSF) | H I J K L | |
| RS_Used (RSU) | G | |
| Newly_Used (NU) | | |
| Current_Redirected (CR) | | |
| Previous_Redirected (PR) | A=>E  E=>G | |

Fig. 13

1300 Write request to A

| Flag | Sectors | 2 |
|---|---|---|
| AU | B C D F | |
| RSF | H I J K L | |
| RSU | G | |
| NU | | |
| CR | | |
| PR | A=>E  E=>G | |

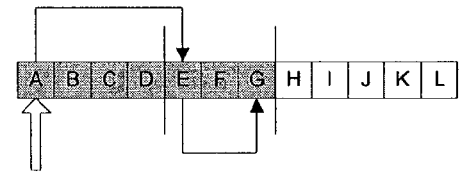
Write Request

1302 Determine flag of A

Previous_Redirected

1304 Find RS_Free sector

| Flag | Sectors | 2 |
|---|---|---|
| AU | B C D F | |
| RSF | H I J K L | |
| RSU | G | |
| NU | | |
| CR | | |
| PR | A=>E  E=>G | |

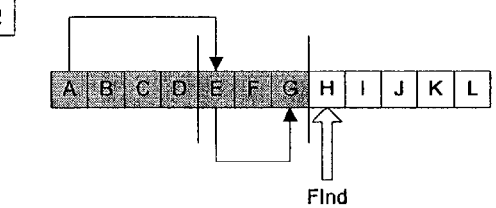
Find

Sector H

1306 Flag H as RS_Used

| Flag | Sectors | 2 |
|---|---|---|
| AU | B C D F | |
| RSF | I J K L | |
| RSU | G H | |
| NU | | |
| CR | | |
| PR | A=>E  E=>G | |

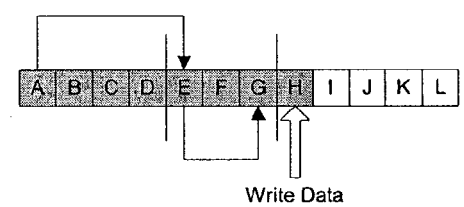
Write Data

1308 Write data to H

1310 Flag A as Current_Redirected

| Flag | Sectors | 2 |
|---|---|---|
| AU | B C D F | |
| RSF | I J K L | |
| RSU | G H | |
| NU | | |
| CR | A=>H | |
| PR | E=>G | |

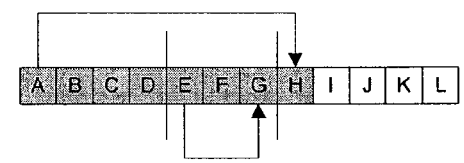

1312 Update A => H

| TYPE / FLAG | SECTORS | 2 |
|---|---|---|
| Already_Used (AU) | B C D F | |
| RS_Free (RSF) | J K L | |
| RS_Used (RSU) | G I | |
| Newly_Used (NU) | | |
| Current_Redirected (CR) | A=>H H=>I | |
| Previous_Redirected (PR) | E=>G | |

| TYPE / FLAG | SECTORS | 3 |
|---|---|---|
| Already_Used (AU) | B C D F | |
| RS_Free (RSF) | J K L | |
| RS_Used (RSU) | G I | |
| Newly_Used (NU) | | |
| Current_Redirected (CR) | | |
| Previous_Redirected (PR) | E=>G  A=>H  H=>I | |

Fig. 18
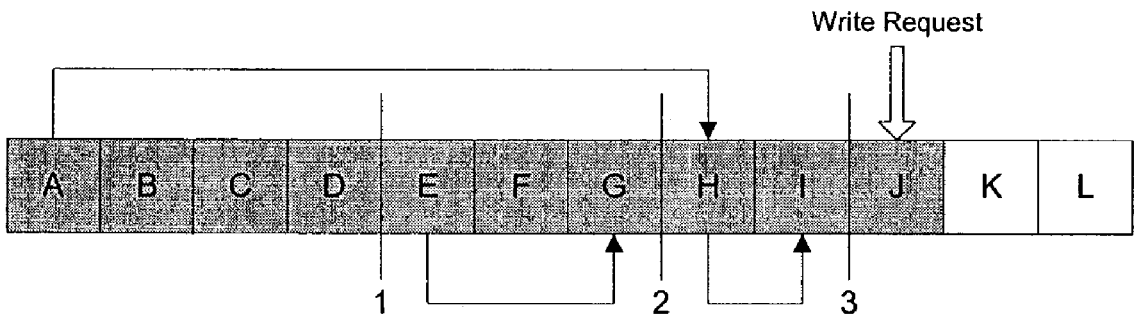
Fig. 19
| TYPE / FLAG | SECTORS | 3 |
|---|---|---|
| Already_Used (AU) | B C D F | |
| RS_Free (RSF) | K L | |
| RS_Used (RSU) | G I | |
| Newly_Used (NU) | J | |
| Current_Redirected (CR) | | |
| Previous_Redirected (PR) | E=>G  A=>H  H=>I | |
Fig. 20
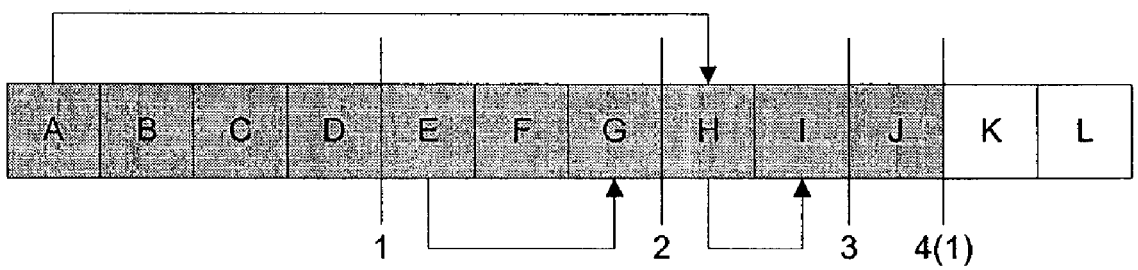

Fig. 21

2100
Identify new recovery data set n to restore hard disk to state reflected by previously identified recovery data set a

2102
Create matrix table n by copying original version of matrix table a

2104
Compare matrix table n to matrix table n-1

2106
Flag each RS_Free sector as Already_Used if that sector is not flagged as RS_Free in matrix table n-1

Fig. 22

2200 Create recovery point 4

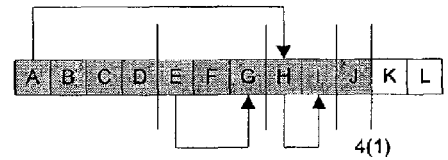

2202 Create matrix table 4 by copying original version of matrix table 1

| Flag | Sectors | 4 |
|---|---|---|
| AU | A B C D | |
| RSF | E F G H I J K L | |
| RSU | | |
| NU | | |
| CR | | |
| PR | | |

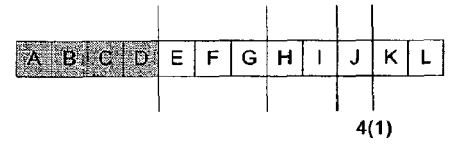

| Flag | Sectors | 4 |
|---|---|---|
| AU | A B C D | |
| RSF | E F G H I J K L | |
| RSU | | |
| NU | | |
| CR | | |
| PR | | |

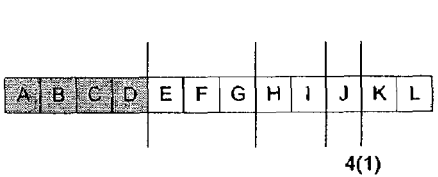

2204 Compare matrix table 4 with working version of matrix table 3

VS.

| Flag | Sectors | 3 |
|---|---|---|
| AU | B C D F | |
| RSF | K L | |
| RSU | G I | |
| NU | J | |
| CR | | |
| PR | E=>G A=>H H=>I | |

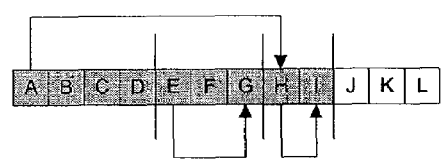

2206 Flag RS_Free sectors as Already_Used if not flagged as RS_Free in matrix table 3

| Flag | Sectors | 4 |
|---|---|---|
| AU | A B C D E F G H I J | |
| RSF | K L | |
| RSU | | |
| NU | | |
| CR | | |
| PR | | |

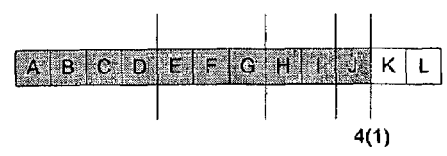

Fig. 23

2300
Create recovery point 5

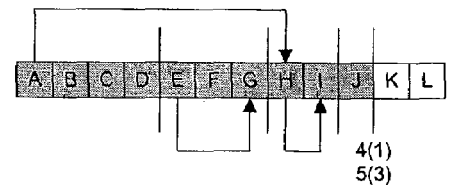

2302
Create matrix table 5 by copying original version of matrix table 3

| Flag | Sectors | 5 |
|------|---------|---|
| AU | B C D F | |
| RSF | J K L | |
| RSU | G I | |
| NU | | |
| CR | | |
| PR | E=>G  A=>H  H=>I | |

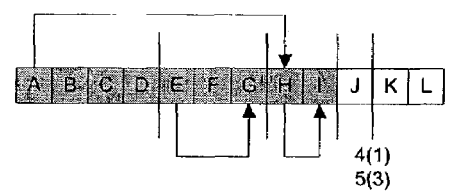

| Flag | Sectors | 5 |
|------|---------|---|
| AU | B C D F | |
| RSF | J K L | |
| RSU | G I | |
| NU | | |
| CR | | |
| PR | E=>G  A=>H  H=>I | |

2304
Compare matrix table 5 with working version of matrix table 4

VS.

| Flag | Sectors | 4 |
|------|---------|---|
| AU | A B C D E F G H I J | |
| RSF | K L | |
| RSU | | |
| NU | | |
| CR | | |
| PR | | |

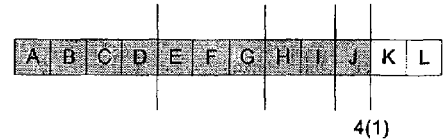

2306
Flag RS_Free sectors as Already_Used if not flagged as RS_Free in matrix table 3

| Flag | Sectors | 5 |
|------|---------|---|
| AU | B C D F J | |
| RSF | K L | |
| RSU | G I | |
| NU | | |
| CR | | |
| PR | E=>G  A=>H  H=>I | |

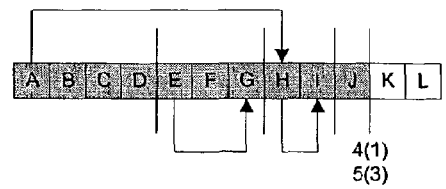

STORED MEMORY RECOVERY SYSTEM

RELATED APPLICATIONS

This application is a continuation-in-part of, and claims priority to, U.S. patent application Ser. No. 09/420,348, filed Oct. 19, 1999 now U.S. Pat No. 6,594,780 and titled "OPERATING SYSTEM AND DATA PROTECTION," which is hereby incorporated by reference in its entirety. This application also claims priority under 35 U.S.C. 119(e) to U.S. Provisional Application No. 60/424,356, filed Nov. 5, 2002 and titled "STORED MEMORY RECOVERY SYSTEM," and U.S. Provisional Application No. 60/459,927, filed Mar. 31, 2003 and titled "STORED MEMORY RECOVERY SYSTEM," which are hereby incorporated by reference in their entireties. This application is related to U.S. patent application Ser. No. 09/617,338, filed Jul. 17, 2000 and titled "OPERATING SYSTEM AND DATA PROTECTION," which is hereby incorporated by reference in its entirety.

BACKGROUND OF THE INVENTION

1. Field of the Invention

The present invention generally relates to computer systems. More particularly, the present invention relates to systems and methods for preserving prior states of protected memory to which computer systems can be restored.

2. Description of the Related Technology

Programs presently exist for backing up data from an area of memory to another area of memory or to an auxiliary storage device. These programs typically operate by physically copying entire computer files or incremental changes to data stored in files, typically after changes are made to the files or at certain predetermined time intervals. Some of these programs allow for the backing up and restoring of the computer operating system. Sometimes, the user performs some modification of a computer file or the operating system that causes corruption of the file or catastrophic operating system failure of the computing system. When this occurs, the file or operating system would be rendered unusable and unrecoverable.

One example of this involves a user performing some undesirable modification of the operating system that disables the computing system and prevents its operation. Another example is when a user desires to "clean up" certain portions of the hard disk of the computing system. In this situation, the user may delete certain files within the hard disk without a great deal of caution or knowledge as to the consequences of the changes being made. A further example is when a computer application program itself erroneously corrupts data files or operating system data.

Many existing programs for backing up and restoring data consume significant computing system resources, for example, processor cycles, memory usage, or disk storage. These systems typically save and restore data by copying from one location to another. Even if the saving of the data is done during times of low utilization of the computer system, e.g., during the evening or during the user's lunch break, the restoration can nonetheless be slow and cumbersome due to having to copy data from the backup storage area to the original storage area.

Therefore, what is needed is a system and method that preserves protected memory in a manner that is transparent to the user, that includes multiple recovery points and that does not consume significant computer system resources. The system and method would also maintain the multiple recovery points by creating and managing one or more tables, e.g., matrix tables, so that restoring the computer system to a previous recovery state would be accomplished in a very fast and efficient manner that does not require the copying of preserved data from one memory location to another.

Further limitations and disadvantages of conventional and traditional systems will become apparent to one of skill in the art through comparison of such systems with the present invention as set forth in the remainder of the present application with reference to the drawings.

SUMMARY OF CERTAIN INVENTIVE ASPECTS

The systems and methods of the invention have several features, no single one of which is solely responsible for its desirable attributes. Without limiting the scope of the invention as expressed by the claims that follow, its more prominent features will now be discussed briefly. After considering this discussion, and particularly after reading the section entitled "Detailed Description of Certain Embodiments" one will understand how the features of the system and methods provide several advantages over traditional systems.

One aspect is a method of recovery to one or more previous memory states in a computer system having a memory, the method comprising receiving a write request to a first memory location, determining whether said first memory location contains protected data, redirecting said write request to a second memory location if said first memory location contains protected data, thereby preserving the contents of the first memory location for a first recovery, and redirecting a subsequent write request to said second memory location to a third memory location, thereby preserving the contents of said second memory location for a second recovery.

This additionally comprises redirecting a read request to said first memory location to said second memory location, thereby returning the contents of said second memory location in response to said read request to said first memory location. This further comprises redirecting a read request to said second memory location to said third memory location, thereby returning the contents of said third memory location in response to said read request to said second memory location. This additionally comprises the above method wherein the memory is accessed via a network. Additionally, this comprises the above method wherein the memory is a disk drive and the memory states are states of the disk drive. This additionally comprises the above method wherein the disk drive is accessed via a network.

This further comprises the above method wherein the protected data contained in the first memory location is operating system data of the computer system. In addition, this comprises the above method wherein the first and second recovery points represent one or more configurations of the computer system. This additionally comprises the above method wherein said first and second recovery points are configuration states, memory states, recovery states, sector states, or computer states.

An additional aspect is a method of recovery to one or more previous memory states in a computer system having a memory, the method comprising selecting a first addressable memory location as part of a first recovery point, receiving a write request to said first addressable memory location, redirecting said write request to a second addressable memory location, selecting said second addressable memory location as part of a second recovery point, and redirecting a subsequent write request to said second addressable memory location to a third addressable memory location.

This additionally comprises redirecting a read request to said first addressable memory location to said second addressable memory location, thereby returning the contents of said second addressable memory location in response to said read request to said first addressable memory location. This further comprises redirecting a read request to said second addressable memory location to said third addressable memory location, thereby returning the contents of said third addressable memory location in response to said read request to said second addressable memory location.

An additional aspect is a method of protecting one or more memory locations from being overwritten, the method comprising creating a table of a status of at least one memory location, receiving a write request to a first memory location, determining if said first memory location contains protected data from a status of said first memory location in said table, redirecting said write request to a second memory location if said first memory location contains protected data, indicating a status of said second memory location in said table that said second memory location contains protected data, redirecting a write request to said second memory location to a third memory location, and indicating a status of said third memory location in said table that said third memory location contains protected data.

This additionally comprises redirecting a read request to said first memory location to said second memory location, thereby returning the contents of said second memory location in response to said read request to said first memory location. This further comprises redirecting a read request to said second memory location to said third memory location, thereby returning the contents of said third memory location in response to said read request to said second memory location.

This additionally comprises the above method wherein the one or more memory locations are accessed via a network. This further comprises the above method wherein the one or more memory locations are locations on a disk drive. This also comprises the above method wherein the disk drive is accessed via a network.

An additional aspect is a method of restoring a computer system to a previous memory state, the method comprising designating at least one memory location as recovery data associated with a first recovery point, redirecting write requests to said at least one memory location to another memory location, and recovering to said first recovery point by designating said at least one memory location and said another memory location as recovery data associated with a second recovery point.

This additionally comprises the above method wherein the memory locations are accessed via a network. This further comprises the above method wherein the memory locations are locations on a disk drive. This also comprises the above method wherein the disk drive is accessed via a network.

An additional aspect is a computer operating system configured to preserve protected memory locations that reside on a computer system and recover to one or more recovery points that represent a previous state of said protected memory locations, the computer operating system comprising a table containing data indicating the status of said protected memory locations, wherein said table is initialized to indicate an original state of said protected memory locations and a driver configured to receive a write request to a first memory location, determine whether said first memory location is a protected memory location, if said first memory location is a protected memory location, find a second memory location that has a status of not used, update said table to indicate a used status of said second memory location, redirect said write request from said first memory location to said second memory location, and update said table to indicate a redirected status of said first memory location to said second memory location.

This additionally comprises the above computer operating system wherein the driver is further configured to redirect a read request to said first memory location to said second memory location, thereby returning the contents of said second memory location in response to said read request to said first memory location. This further comprises the above computer operating system wherein the driver is further configured to receive a write request to said second memory location, determine whether said second memory location is a protected memory location, if said second memory location is a protected memory location, find a third memory location that has a status of unused, update said table to indicate a used status of said third memory location, redirect said write request from said second memory location to said third memory location, and update said table to indicate a redirected status of said second memory location to said third memory location.

This additionally comprises the above computer operating system wherein the driver is further configured to redirect a read request to said second memory location to said third memory location, thereby returning the contents of said third memory location in response to said read request to said second memory location. This further comprises the above computer operating system wherein the memory locations are accessed via a network. This also comprises the above computer operating system wherein the memory locations are locations on a disk drive. This additionally comprises the above computer operating system wherein the disk drive is accessed via a network.

An additional aspect is a method of preserving protected memory locations that reside on a computer system and recovering to one or more recovery points that represent a previous state of said protected memory locations, the method comprising initializing a table containing data indicating the status of said protected memory locations to indicate an original state of said protected memory locations, receiving a write request to a first memory location, determining whether said first memory location is a protected memory location, if said first memory location is a protected memory location, finding a second memory location that has a status of not used, updating said table to indicate a used status of said second memory location, redirecting said write request from said first memory location to said second memory location, and updating said table to indicate a redirected status of said first memory location to said second memory location.

This additionally comprises redirecting a read request to said first memory location to said second memory location, thereby returning the contents of said second memory location in response to said read request to said first memory location. This further comprises receiving a write request to said second memory location, determining whether said second memory location is a protected memory location, if said second memory location is a protected memory location, finding a third memory location that has a status of unused, updating said table to indicate a used status of said third memory location, redirecting said write request from said second memory location to said third memory location, and updating said table to indicate a redirected status of said second memory location to said third memory location.

This further comprises redirecting a read request to said second memory location to said third memory location, thereby returning the contents of said third memory location in response to said read request to said second memory location. This additionally comprises the above method wherein the memory locations are accessed via a network.

An additional aspect is a method of creating a plurality of tables in a computer system having protected memory locations, said plurality of tables representing a plurality of recovery points that represent previous states of said protected memory locations, the method comprising creating an initial table indicating an original state of said protected memory locations, identifying a new recovery point representing a new state of said protected memory locations to be preserved, creating a new table corresponding to said new recovery point, wherein said new table is a copy of said initial table, comparing said new table to a most recently created previous table, and if said new table indicates an unused status for one or more memory locations for which corresponding memory locations of said previous table indicate a used status, updating said new table to indicate a status of protected for said one or more memory locations.

This additionally comprises the above method wherein the memory locations are accessed via a network. This further comprises the above method wherein the memory locations are locations on a disk drive. This also comprises the above method wherein the disk drive is accessed via a network.

An additional aspect is a computer readable storage medium having stored thereon instructions that when executed by a computer processor perform a method of recovery to one or more previous memory states in a computer system having a memory, the method comprising receiving a write request to a first memory location, determining whether said first memory location contains protected data, redirecting said write request to a second memory location if said first memory location contains protected data, thereby preserving the contents of the first memory location for a first recovery, and redirecting a subsequent write request to said second memory location to a third memory location, thereby preserving the contents of said second memory location for a second recovery.

This additionally comprises the above computer readable storage medium, wherein the method further comprises redirecting a read request to said first memory location to said second memory location, thereby returning the contents of said second memory location in response to said read request to said first memory location.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

FIG. 2 is a diagram illustrating the relationship between files, clusters and sectors in a file system such as FAT16 or FAT32.

FIG. 3 is a diagram illustrating a simplified representation of 12 sectors, labeled A-L, of a hard disk.

FIG. 4 is a diagram illustrating the sectors of FIG. 3 after the Identify_Module has identified a set of recovery data.

FIG. 5 is a diagram illustrating a representation of a matrix table, e.g., matrix table 1, associated with the recovery data set 1 discussed above with regard to FIG. 4.

FIG. 8 is a diagram illustrating an embodiment of a process, matrix tables and sector representations associated with a write request from file system to a sector flagged as RS_Used.

FIG. 9 is a diagram illustrating an embodiment of a process, matrix tables and sector representations associated with a write request from the file system to a sector flagged as Newly_Used.

FIG. 13 is a diagram illustrating an embodiment of a process, matrix tables and sector representations associated with a write request from file system to a sector flagged as Previous_Redirected, with respect to matrix table 2 shown in FIG. 12.

FIG. 18 is a diagram illustrating a further representation of the 12 hard disk sectors with three identified recovery data sets.

FIG. 19 is a diagram illustrating an embodiment of a representation of the working version of matrix table 3 after the Writes_Module processes the write request to sector J.

FIG. 20 is a diagram illustrating an embodiment of an overview of the newly identified recovery data set, e.g., recovery data set 4.

FIG. 21 is a flowchart illustrating an embodiment of a process performed by the Recover_Module to restore the hard disk to a state reflected by a previously identified recovery data set.

FIG. 22 is a diagram illustrating in greater detail an embodiment of a process, matrix tables and sector representations associated with the embodiment shown in FIG. 20, with the Recover_Module performing the process as discussed above with regard to FIG. 21.

FIG. 23 is a diagram illustrating an embodiment of a process, matrix tables and sector representations in which the Recover_Module creates recovery point 5 to restore to recovery point 3 after creating recovery point 4 to recover to recovery point 1 as shown in FIG. 22.

DETAILED DESCRIPTION OF CERTAIN EMBODIMENTS

Figure 1:
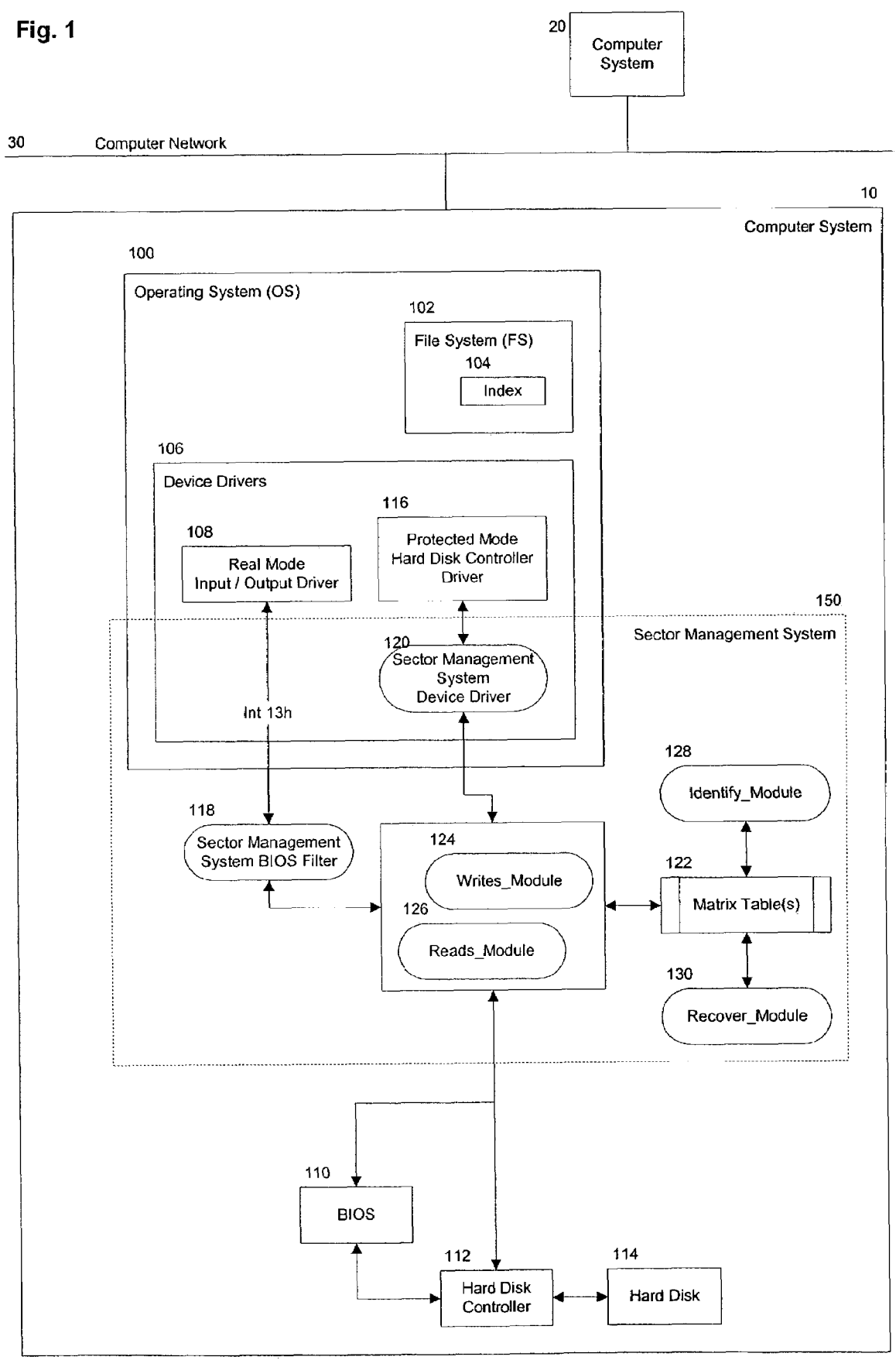
FIG. 1 is a block diagram illustrating embodiments of the components or modules of a computer system with a sector management system.

The following detailed description is directed to certain specific embodiments of the invention. However, the invention can be embodied in a multitude of different ways as defined and covered by the claims. The scope of the invention is to be determined with reference to the appended claims. In this description, reference is made to the drawings wherein like parts are designated with like numerals throughout.

The sector management system may be comprised of various components or modules that perform the functionality as described in detail below. The components or modules may comprise various software sub-routines, procedures, definitional statements and macros. Each of the components or modules are typically separately compiled and linked into a single executable program. Therefore, reference to components or modules in the following description is used for convenience to describe the functionality of embodiments of the system. Thus, the processes that are undergone by each of the components or modules may be arbitrarily redistributed to one of the other components or modules, combined together in a single components or module, or made available in, for example, a shareable dynamic link library.

In certain embodiments, these components or modules may be configured to reside on the addressable storage medium of a computer system and configured to execute on a processor, or on multiple processors. The components or modules include, but are not limited to, software or hardware components that perform certain tasks. Thus, a component or module may include, by way of example, software components, object-oriented software components, class components and task components, processes, functions, attributes, procedures, subroutines, segments of program code, drivers, firmware, microcode, circuitry, data, databases, data structures, tables, arrays, and variables. Furthermore, the functionality provided for in the components or modules may be combined into fewer components, modules, or databases or further separated into additional components, modules, or databases. Additionally, the components or modules may be implemented to execute on a computer, or on multiple computers.

The sector management system is capable of protecting selected data stored in a computer system so that the computer system can be restored to the state represented by the protected data. Another aspect of the sector management system allows the computer system to be restored to more than one state. In some embodiments, data is protected from being overwritten by redirecting write requests to other locations.

The sector management system may be implemented utilizing various types of memory storage, e.g., computer memory devices (such as Random Access Memory, or RAM), removable storage, local hard disks and memory storage that is accessed via hard disks located remotely and accessed via a network. In other embodiments, the sector management system is implemented utilizing firmware, software (e.g., programs or data) stored in non-volatile memory such as read-only memory (ROM). Types of ROM include, for example, programmable read-only memory (PROM), erasable programmable read-only memory (EPROM), electrically erasable programmable read-only memory (EEPROM), and flash memory. For ease of explanation, the sector management system is described below in terms of the local hard disk embodiments.

The sector management system as described herein utilizes a table, for example, a matrix table or a file allocation table (FAT), for the storage and retrieval of sector state data. However, in other embodiments, the sector management system may utilize different ways of storing and retrieving sector state data, for example, using an algorithmic approach, static or dynamic linking techniques, or other types of tables or data storage schemes for storing and retrieving sector state data. The table for storing the sector state may be stored on any of a number of storage devices, for example, a mass storage device such as a hard drive, a memory device, or even split across multiple devices, such as a Redundant Array of Independent Disks (RAID) system.

As used herein, the terms memory state, recovery data, recovery point, recovery state, sector state, configuration, system or software configuration, or personal computer (PC) state, may be used essentially interchangeably herein to refer to the data associated with a particular state, configuration or status of the computer system or storage device. In some embodiments, the recovery point may include the operating system of the computer system, and the operating system may have storage tables, for example, a file allocation table (FAT), which refers to a table the operating system uses to locate files on a disk device. Thus, each recovery point or sector state can itself act as a separate and independent operating system.

In other embodiments, recovery points represent system or software configurations. System or software configurations can refer to versions of the operating system, operating environment, application software programs, utility software programs, or data used by any of these. These embodiments are described below following the description of the figures.

While the systems and methods described herein have many manners of use and implementation, the following describes various embodiments in terms of a recovery system for illustrative purposes only. However, as would be understood by those skilled in the technology, other embodiments of the sector management system, for example, restoration or reversion systems, configuration management systems, and security systems, could also be implemented using the systems and methods as described herein.

FIG. 1 is a block diagram illustrating embodiments of the components or modules of a computer system 10 with a sector management system 150. However, it should be understood that modules represented herein as software may also be implemented as hardware, for example, as an application-specific integrated circuit (ASIC). The computer system 10 may be one of a number of microprocessor or processor controlled devices, for example, personal computers, workstations, servers, clients, mini computers, mainframe computers, laptop computers, a network of individual computers, mobile computers, palm-top computers, handheld computers, set top boxes for a television, other types of web-enabled televisions, interactive kiosks, personal digital assistants, interactive or web-enabled wireless communications devices, mobile web browsers, or a combination thereof. The computers may further possess input devices such as a keyboard, mouse, touchpad, touch screen, joystick, pen-input-pad, and the like. The computers may also possess an output device, such as a screen or other visual conveyance means and a speaker or other type of audio conveyance means.

The computer system 10 is generally controlled by an operating system 100, such as DOS, Windows, Macintosh OS, OS/2, Linux, or others. A key part of many operating systems 100 is a file system 102, with which the operating system 100 manages and stores files. Files refer not only to user data, but also to any of the files on the computer including, for example, program files and configuration files. Examples of file systems 102 include FAT16, FAT32 and Microsoft NT file system (NTFS). Generally the file system 102 has an index 104 to track the locations of files in the memory of the computer system. For example, the FAT16 and the FAT32 file systems use the file allocation table (FAT) to keep track of files.

The operating system 100 may also include one or more device drivers, collectively identified as 106 in FIG. 1, which enable communication with hardware devices, such as a hard disk 114. One example of a device driver is the real mode input/output (I/O) driver 108 (IO.SYS) in DOS and DOS-based versions of Windows. The real mode I/O driver 108 generally relies on the BIOS (basic input/output system) 110 to communicate with the hard disk 114, as explained below. The BIOS 110 handles read and write requests to the hard disk 114.

Another component of the system shown in FIG. 1 is the hard disk 114. While embodiments as shown in FIG. 1 illustrate the hard disk 114 being located internal to the computer system 10 from which the recovery point storage or retrieval is being initiated, other embodiments may be utilized in which the hard disk 114 is located external to the computer system 10. As an example, the hard disk 114 may alternatively be a storage device that is located on another computer system that is accessible via a computer network 30. The network 30 could be, for example, an Ethernet network in which distributed servers having a hard disk or other storage device are connected to the network 30, and are accessible to the other devices on the network. Thus, storage and retrieval of recovery data, as described in detail below, could be directed to a local storage device, such as the hard disk 114 (as shown in FIG. 1), or to a remote storage device (not shown) accessible via the network 30.

The network 30 may implement virtual private network (VPN) capabilities. A VPN can be a secure and encrypted communications link between nodes on a network, for example, the Internet, a Wide Area Network (WAN), a Local Area Network (LAN), or an Intranet. These nodes can communicate with each other. However, it is very difficult for an unauthorized user, for example, a hacker, to either comprehend the meaning of the signals or send signals that are believed to be authentic. One secure communications technology that is designed to facilitate a VPN is Secure Sockets Layer (SSL). Other secure communications technologies can be used as well.

A VPN can operate between a number of internet-enabled devices. For example, a VPN can run on two or more PCs that are connected together using various security technologies. In other embodiments, a VPN can operate between a PC and a website using security technologies. In further embodiments, a VPN can additionally operate between many PCs and/or many websites. For example, hand-held devices such as personal digital assistants (PDAs), wireless devices such as mobile or cell phones, web-enabled TV sets can also be used as client devices instead of PCs as part of the VPN.

In some computer systems, the smallest addressable unit on the hard disk 114 is the sector. However, in both FAT16 and FAT32, two very common file systems 102, the smallest addressable memory allocation unit on a hard disk is the cluster, which is an integer multiple number of sectors. In an operating system 100 with such file systems, the real mode I/O driver 108 also functions in units of clusters. In the FAT16 and FAT32 file systems, each file is stored in one or more clusters, with each file occupying an integer multiple number of clusters. The file system 102 tracks the location of each file by noting the address of the first cluster storing a file (e.g., the starting cluster) in its index 104 (FAT). If a file is larger than one cluster, thus occupying more than one cluster, a pointer is provided at the end of each cluster, except the last one, pointing to the next cluster in which part of the file is stored. In still other embodiments, other addressable units besides clusters and sectors are utilized, and such embodiments are also within the scope of the present invention.

The computer system 10 may be connected to the computer network 30, or may alternatively operate in a standalone mode without being connected to a network. The computer network is a type of computer communication link or combination of computer communication links spanning any geographical area, such as a local area network, wide area network, regional network, national network, global network, or any combination of these types of networks. These terms may refer to hardwire networks, wireless networks, dial-up networks, or a combination of these or other networks. Hardwire networks may include, for example, fiber optic lines, cable lines, ISDN lines, copper lines, etc. Wireless networks may include, for example, cellular systems, personal communication services (PCS) systems, satellite communication systems, packet radio systems, and mobile broadband systems.

Through the computer network 30, the computer system 10 is able to exchange data with other computer systems that are additionally connected to the computer network 30, as shown by the computer system 20 in FIG. 1. While FIG. 1 shows only two computer systems 10, 20 connected to the computer network 30, additional computer systems may also be connected to the computer network 30 to which communication links may be established for the exchange of data. The additional computer systems on the network 30, such as the computer system 20 shown in FIG. 1, may be configured similar to the computer system 10 as illustrated in FIG. 1, or may be configured differently, for example, without some or all of the sector management system 150 components.

In some embodiments, one or more enterprise manager modules or components may execute on any node on the network 30, such as the computer system 20. The manager capability may be utilized in an organization with computers connected to a network, often referred to as an enterprise computing system. An Intranet, a network used to share information within an organization accessible only by those within the organization or others with authorization, is one example of an enterprise computing system. The enterprise manager modules include the capability to initiate the storage or retrieval of sector states remotely. For example, the enterprise manager modules executing on the computer system 20 are able to initiate the storage or retrieval of states of the computer system 10 via data communicated over the network 30. Thus, using the example of FIG. 1, a computer system 10 that has become non-operational may be remotely restored to an operational state by someone, for example, Information Technology (IT) personnel, from the computer system 20. In other embodiments, the enterprise manager modules control and initiate the storage or retrieval of sector states on a multitude of computer systems 10 that are connected to the network 30.

The enterprise manager may additionally include the capability to monitor statistics regarding the storage or retrieval of sector states on multiple remote computer systems that are connected to the network 30. For example, such statistical data may include when recovery states were saved, when computer systems were restored to previously saved states, or the number of storage or retrieval operations that have been performed on a computer by computer basis. Execution of the enterprise manager is optional, however, as the sector management system is fully capable of standalone operation, whether or not the computer system is connected to a network.

FIG. 2 is a diagram illustrating the relationship between files, clusters and sectors in a file system 102 such as FAT16 or FAT32. In this example, each cluster is formed of 8 sectors. While the file in this example may only require 19 sectors (represented by the vertical dash line) to store, it occupies 3 clusters because the cluster is the smallest addressable file allocation unit in the file system 102. The arrows from the end of one cluster to the next indicate that the file is continued in the next cluster. Another way to look at this is that in storing this file on the hard disk, only sectors 1-19 of the hard disk 114 are written to or used, while sectors 20-24 are free. However, while sectors 20-24 are free, the file system 102 is only able to address sectors 17-24 together as cluster 3. The file system 102 indicates that clusters 1-3 are already used to store a file, and thus cluster 3 is unavailable for the storage of another file. (The file system 102 as described above cannot read the hard disk 114 at the sector level.) Thus sectors 20-24 represent wasted space, usually called slack.

Referring again to FIG. 1, a hard disk controller 112 is the hardware interface to the hard disk 114. The hard disk controller 112 manages the transfer of information to and from the hard disk 114. ATA (advanced technology attachment) also know as IDE (integrated drive electronics), SCSI (small computer systems interface) and USB (universal serial bus) are examples of interfaces that can be employed as the interface between the hard disk controller and the computer. One or more hard disk controllers 112 are often integrated into many motherboard chipsets, for example, those developed by Intel and AMD.

Because of the difference in addressable units between, for example, the FAT16 and FAT32 file systems 102 (clusters) and the hard disk 114 (sectors), communications between the operating system 100 and the hard disk 114 are often translated. In an example system, this translation is performed by the BIOS 110. In one example, the real mode I/O driver 108 uses interrupt 13$h$ (Int 13$h$) to call the BIOS 110. Using the BIOS 110 to translate between the operating system 100 and the hard disk 114 incurs a performance cost. It also requires the use of the real mode I/O driver 108, decreasing operating system stability. In DOS and earlier DOS-based versions of Windows, such as Windows 3.x and Windows 95, the real mode I/O driver 108 is used to communicate with the hard disk 114, thus necessitating the use of the BIOS 110 for the aforementioned translation.

Thus a more recent operating system 100, such as Windows NT and 2000, may use a protected mode hard disk controller driver 116 to communicate with the hard disk 114, without the need to use the BIOS 110. The protected mode hard disk controller driver 116 is usually specific to the hard disk controller 112 in the computer, and is able to address the hard disk 114 at the sector level. ATA and SCSI hard disk controllers 112, for example, are also dedicated controllers optimized to communicate with storage devices. In more recent Windows operating systems, e.g., Windows NT and 2000, the protected mode hard disk controller driver 116 loads towards the beginning of the boot process, and communication with the hard disk 114 is handled entirely by this driver.

In some other intermediate operating systems 100, such as later DOS-based versions of Windows, including Windows 95OSR2, 98, 98SE and Me, a real mode I/O driver 108 is used to communicate with the hard disk 114 while the operating system 100 is loading during the boot process of the computer. Thus the BIOS 110 may be used to translate communication between the real mode I/O driver 108 and the hard disk 114. A protected mode hard disk controller driver 116 is loaded with the operating system 100. After the loading of the protected mode hard disk controller driver 116, it takes over the communication with the hard disk 114, and the real mode I/O driver 108 and the BIOS 110 are no longer used to communicate with the hard disk 114.

In certain embodiments, the sector management system BIOS filter module 118 intercepts read and write requests from the real mode I/O driver 108 to the BIOS 110, for example, by intercepting interrupt 13$h$ calls from the real mode I/O driver 108 to the BIOS 110. The BIOS filter 118 may be implemented as a terminate-&-stay-resident (TSR) program. These embodiments may be used with DOS and earlier DOS-based versions of Windows, such as Windows 3.x, Windows 95 and similar systems.

In other embodiments, the sector management system device driver module 120 intercepts read and write requests from the protected mode hard disk controller driver 116 to the hard disk controller 112. This embodiment may be used with Windows NT and 2000 and similar systems.

In still further embodiments, the BIOS filter 118 intercepts read and write requests from the real mode I/O driver 108 to the BIOS 110, for example, while the operating system 100 is loading during the boot process of the computer. The device driver 120 intercepts read and write requests from the protected mode hard disk controller driver 116 to the hard disk controller 112, for example, after the operating system 100 has loaded. These embodiments may be used with later DOS-based versions of Windows, such as Windows 95OSR2, 98, 98SE and Me and similar systems.

In some embodiments, intercepted write requests, whether interrupted by the device driver 120 or the BIOS filter 118, are passed to a Writes_Module 124. Similarly, intercepted read requests are passed to a Reads_Module 126. The Writes_Module 124 and the Reads_Module 126 may redirect write and read requests to certain sectors, respectively, depending on the flags of the target sectors in matrix table(s) 122. Although illustrated in the embodiment of FIG. 1 as a matrix table 122, other embodiments utilize different ways of storing and retrieving sector data, for example, using an algorithm to generate pointer information, static or dynamic linking techniques, or the like. For example, sector data may be input to an algorithm that produces one or more tables corresponding to one or more recovery points as appropriate for the sector data. Redirecting of reads and writes to sectors of memory storage, for example, to perform read and recover operations, can thus be accomplished in multiple ways.

The sector management system 150 also includes an Identify_Module 128 and a Recover_Module 130. The Writes_Module 124, the Reads_Module 126, the Identify_Module 128 and the Recover_Module 130 all interact with the matrix table(s) 122, as discussed in further detail below.

The functions described herein for the RS BIOS filter 118, the RS device driver 120, the Writes_Module 124, the Reads_Module 126, the Identify_Module 128 and the Recover_Module 130, may also be implemented by other components in other embodiments of the sector management system 150. For example, the sector management system 150 can be built into the BIOS 110, or implemented in the logic of the hard disk controller 112 or in the code of the protected mode hard disk controller driver 116.

Although described in reference to the embodiment illustrated in FIG. 1 and utilizing the Windows operating systems and their associated device drivers and hardware implementations, the systems and methods described herein may be implemented in numerous other embodiments utilizing various other operating systems and hardware configurations. For example, in certain embodiments the systems and methods may be incorporated into the operating system, e.g., Windows. In such embodiments, the system and method are integrated into and are part of the normal write and read flow of the operating system. In addition, the matrix table may be integrated into and be part of the FAT file system data. Still other embodiments are also possible, and are considered to be within the scope of the present invention. For example, certain embodiments maintain the recovery data in other types of tables beside a matrix table, or organized in other ways besides in a table format.

FIG. 3 is a diagram illustrating a simplified representation of 12 sectors, labeled A-L, of a hard disk. Though the sectors are shown in this simplified representation as being physically contiguous, that is not necessarily so in the hard disk. In addition, sectors A-L do not all need to be located physically on one hard disk or memory device. For example, they can be located in multiple locations such as on RAID (redundant array of independent disks) devices or spread across a variety of memory devices. The first four sectors, A-D, are used, which is represented by shading. The next eight sectors, E-L, are free. A "used" sector refers to a sector in which useful or valid data is stored. A "free" sector refers to a sector in which no useful data is currently stored. A free sector can be a sector that is actually blank, or a sector in which the data is no longer accessible. For example, when a file is deleted by the file system 102 such as FAT16 or FAT32, its corresponding entry in the FAT may be simply deleted, without actually erasing the data from the sectors it occupies. While the data in the sectors may remain, the sectors appear to be free because the clusters they belong to are not associated with an entry in the FAT.

FIG. 4 is a diagram illustrating the sectors of FIG. 3 after the Identify_Module 128 has identified a set of recovery data. The set of recovery data reflects the state or contents of the memory at the point in time at which the set of recovery data was identified. The point in time at which a set of recovery data or a recovery state is identified is alternatively referred to as a recovery point, sector state, memory state, system state, computer state, or personal computer (PC) state. Accordingly, these terms are generally synonymous as used herein and may be substituted for one another while maintaining consistent meaning and explanation. Thus recovery point 1 refers to the point in time at which recovery data set 1 was identified. The set of recovery data is identified so that the sector management system 150 can recover (or restore) the memory to that state at a later time. In FIG. 4 the first set of recovery data is located in the sectors A-D which are to the left of the vertical line between sectors D and E. In this example, the set of recovery data includes data in sectors that are already in use when the set of recovery data is identified. In this example sectors A-D are the sectors in use that contain the first set of recovery data, e.g., recovery data set 1. For ease of discussion, sectors A-D are represented as being contiguous, or adjacent to each other, and thus the identified recovery data, recovery data set 1, can be delineated by a vertical line which separates the sectors containing the recovery data, sectors A-D, from the other sectors E-L. Of course, the sectors containing the set of recovery data do not have to be contiguous or adjacent. The sector management system 150 may allow the user to create a recovery point. The sector management system 150 may also be configured to automatically create a recovery point periodically, for example, for a weekly backup. The sector management system 150 may also be triggered by certain events to create a recovery point, for example, after a scandisk operation finds a bad cluster.

FIG. 5 is a diagram illustrating a representation of a matrix table, e.g., matrix table 1, associated with the recovery data set 1 discussed above with regard to FIG. 4. In some embodiments, the Identify_Module 128 creates a matrix table for each set of recovery data. After the Identify_Module 128 creates the matrix table 122, it saves a copy of the matrix table as an original version. Subsequent changes to the matrix table are saved in a working version. The sector management system 150 uses one or more matrix tables to track the status or state of sectors. The matrix table(s) can be located in protected sections on the hard disk or memory. Alternatively they can be stored in other locations, for example, a dedicated area on the hard disk, and on other memory devices, for example, a flash memory USB dongle (a device that attaches to a computer to control access to a particular application is often referred to as a dongle). In this embodiment, the matrix table tracks six types of sector status defined as follows:

1. Already_Used (AU)—Sectors already used before the sector management system 150 identifies recovery data at a recovery point.
2. RS_Free (RSF)—Sectors that are actually free, as determined by the sector management system 150.
3. RS_Used (RSU)—Sectors used by the sector management system 150 to store new data that would otherwise overwrite data in protected sectors.
4. Newly_Used (NU)—Sectors used to store new data that would not overwrite data in protected sectors.
5. Current_Redirected (CR)—Sectors redirected to other sectors.
6. Previous_Redirected (PR)—Similar to Current_Redirected, but used when there is more than one recovery point. The creation of more recovery points is discussed in further detail below.

The sectors of the hard disk 114 or other memory are identified as being one of the six status types in the matrix table 122. In some embodiments, the matrix table 122 needs only to explicitly track five of the six status types of sectors, while the sixth status type is derived from the other five via a process of elimination. In still further embodiments, fewer or greater numbers of status types may be used, and these embodiments are also within the scope of the present invention. However, the discussion is more easily followed if the embodiment utilizing six status types is discussed.

In certain embodiments, a new matrix table is created for every set of recovery data or recovery point. A copy of each newly created matrix table is saved as the original version to represent the state of the hard disk 114 at that recovery point. The original version of the matrix table 122 is used to recover to the corresponding recovery point, as discussed in further detail below. As write requests are redirected and sector status type flags are changed after the identification of recovery data, these changes are saved to the working version of the matrix table 122. While the two versions of the matrix table 122 may be conceptualized as separate tables, the working version may be represented as a list of changes to the original version. The information stored in the matrix tables 122 does not necessarily have to be stored in a matrix table for each recovery point. In other embodiments, for example, all the redirections and changes to sector status type flags from multiple recovery points can be stored together, as long as the information associated with each recovery point can be delineated from the information associated with other recovery points.

As write requests are intercepted and redirected to other sectors, the sectors that appear to the file system as free (those belonging to free clusters) may have actually been used by the sector management system 150, e.g., to store redirected write requests. Thus the sector management system 150 tracks via the matrix table sectors that are actually free with the status type flag RS_Free. In other embodiments in which the present systems and methods are integrated into the operating system, the write requests are more aptly described as being part of the normal write flow of the operating system rather than being intercepted as described above.

Referring again to FIG. 1, the file system 102 generates a write request directed at one or more clusters. The write request is translated and expressed in sectors by either the BIOS 110 or the protected mode hard disk controller driver 120. The translated write requests are intercepted (or trapped) in certain embodiments by the RS BIOS filter 118 or, alternatively, by the RS device driver 120, before they reach the hard disk 114. The Writes_Module 124 of the sector management system 150 processes the intercepted write requests.

In connection with the embodiments of FIGS. 6-10 as described below, the processing of write requests by the sector management system 150 are discussed in detail. The left columns in those figures are flowcharts representing the process or steps. The middle columns show changes to the matrix table associated with the steps. The right columns illustrate graphical representations of the 12 example hard disk sectors shown in FIG. 3.

Figure 6:
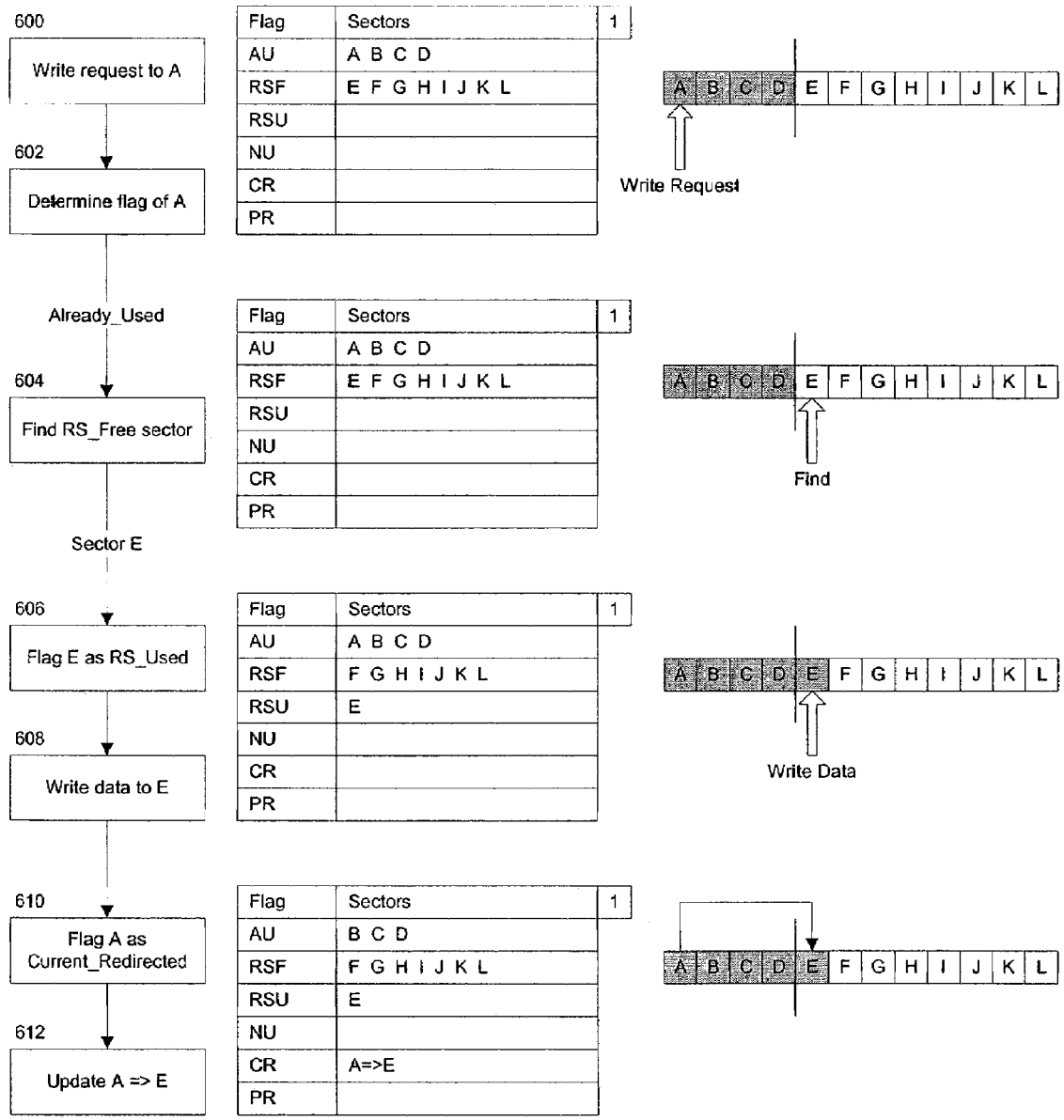
FIG. 6 is a diagram illustrating an embodiment of a process, matrix tables and sector representations associated with a write request from the file system to a sector flagged as Already_Used.

FIG. 6 is a diagram illustrating an embodiment of a process, matrix tables and sector representations associated with a write request from the file system 102 to a sector flagged as Already_Used. In step 600 the RS BIOS filter 118 or the RS device driver 120 intercepts a write request to sector A. As was noted above with regard to FIG. 1, the write request can be intercepted, for example, via BIOS Int 13*h* (RS BIOS filter 118) or by intercepting the write request from the protected mode hard disk controller driver 116 (RS device driver 120). In other embodiments in which the present systems and methods are integrated into the operating system, the write requests are more aptly described as being part of the normal write flow of the operating system rather than being intercepted as described above. In step 602 sector A is determined to be flagged as Already_Used by reference to matrix table 1. At this point the original version and the working version of matrix table 1 are the same, as there has not been any changes yet. In step 604 the Writes_Module 124 finds a sector that is flagged as RS_Free from the working version of matrix table 1, e.g., sector E. Sector E is then flagged as RS_Used in the working version of matrix table 1 in step 606. In step 608 the data contained in the write request of step 600 is written to sector E. In step 610 sector A is flagged as Current_Redirected in the working version of matrix table 1. In step 612 the redirection from sector A to sector E is updated in the working version of matrix table 1 to represent that the current data of sector A is in sector E. While the last four steps, steps 606-612, are illustrated in a particular order, they may actually be carried out in any order. The foregoing steps or process protect the data in sector A from being overwritten while allowing the computer system to operate as if sector A had been overwritten. This can enable the sector management system 150 to be transparent to the file system 102.

Figure 7:
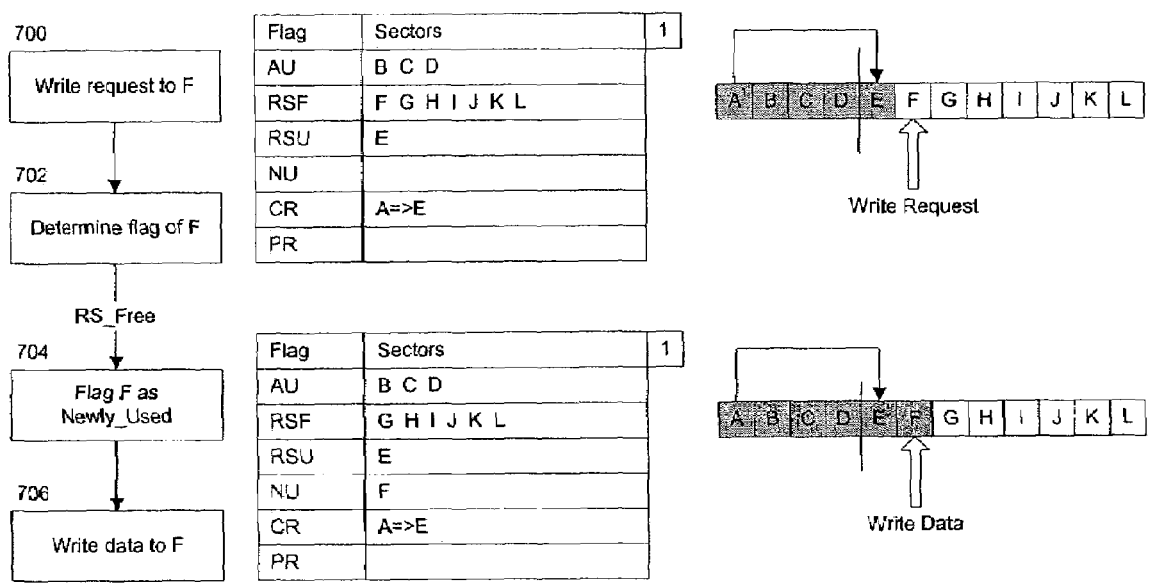
FIG. 7 is a diagram illustrating an embodiment of a process, matrix tables and sector representations associated with a write request from the file system to a sector flagged as RS_Free.

FIG. 7 is a diagram illustrating an embodiment of a process, matrix tables and sector representations associated with a write request from the file system 102 to a sector flagged as RS_Free. In step 700, in the same manner as described above in connection with step 600, a write request to sector F is intercepted. In step 702 the Writes_Module 124 refers to the working version of matrix table 1 and determines that sector F is flagged as RS_Free. In step 704 sector F is flagged as Newly_Used in the working version of matrix table 1. In step 706 the data contained in the write request of step 700 is written to sector F. The last two steps, steps 704 and 706, may be carried out in reverse order. Write requests to RS_Free sectors do not have to be redirected because no protected data, that is, data contained in sectors identified as recovery data set 1, are being overwritten.

FIG. 8 is a diagram illustrating an embodiment of a process, matrix tables and sector representations associated with a write request from file system 102 to a sector flagged as RS_Used. In step 800 a write request to sector E is intercepted in the manner described above. Note that as discussed above, while the file system 102 may see sector E as a free sector, it is actually in use to store redirected data that would have otherwise overwritten sector A. In step 802 the Writes_Module 124 refers to the working version of matrix table 1 and determines that sector E is flagged as RS_Used. In step 804 the Writes_Module 124 finds a sector that is flagged as RS_Free from the working version of matrix table 1, e.g., sector G. Sector G is then flagged as RS_Used in the working version of matrix table 1 in step 806. In step 808 the data contained in the write request of step 800 is written to sector G. In step 810 sector E is flagged as Current_Redirected in the working version of matrix table 1. In step 812 the redirection from sector E to sector G is updated in the working version of matrix table 1. While the last four steps, steps 806-812, are illustrated in a particular order, they may actually be carried out in any order. As discussed above, RS_Used sectors are used by the sector management system 150 to store data that would have otherwise overwritten protected sectors, or sectors identified as containing data belonging to a recovery data set. Thus write requests to RS_Used sectors are redirected, to preserve the data therein. Subsequent write requests to sector E are also redirected to sector G. Sector G appears transparently to the file system as sector E.

FIG. 9 is a diagram illustrating an embodiment of a process, matrix tables and sector representations associated with a write request from the file system 102 to a sector flagged as Newly_Used. In step 900 a write request to sector F is intercepted in the manner described above. In step 902 the Writes_Module 124 refers to the working version of matrix table 1 and determines that sector F is flagged as Newly_Used. In step 904 the data contained in the write request of step 900 is written to sector F. Because sector F did not contain data to be protected, as sector F was not in use before recovery data set 1 was identified at recovery point 1, the sector management system 150 allows sector F to be overwritten.

Figure 10:
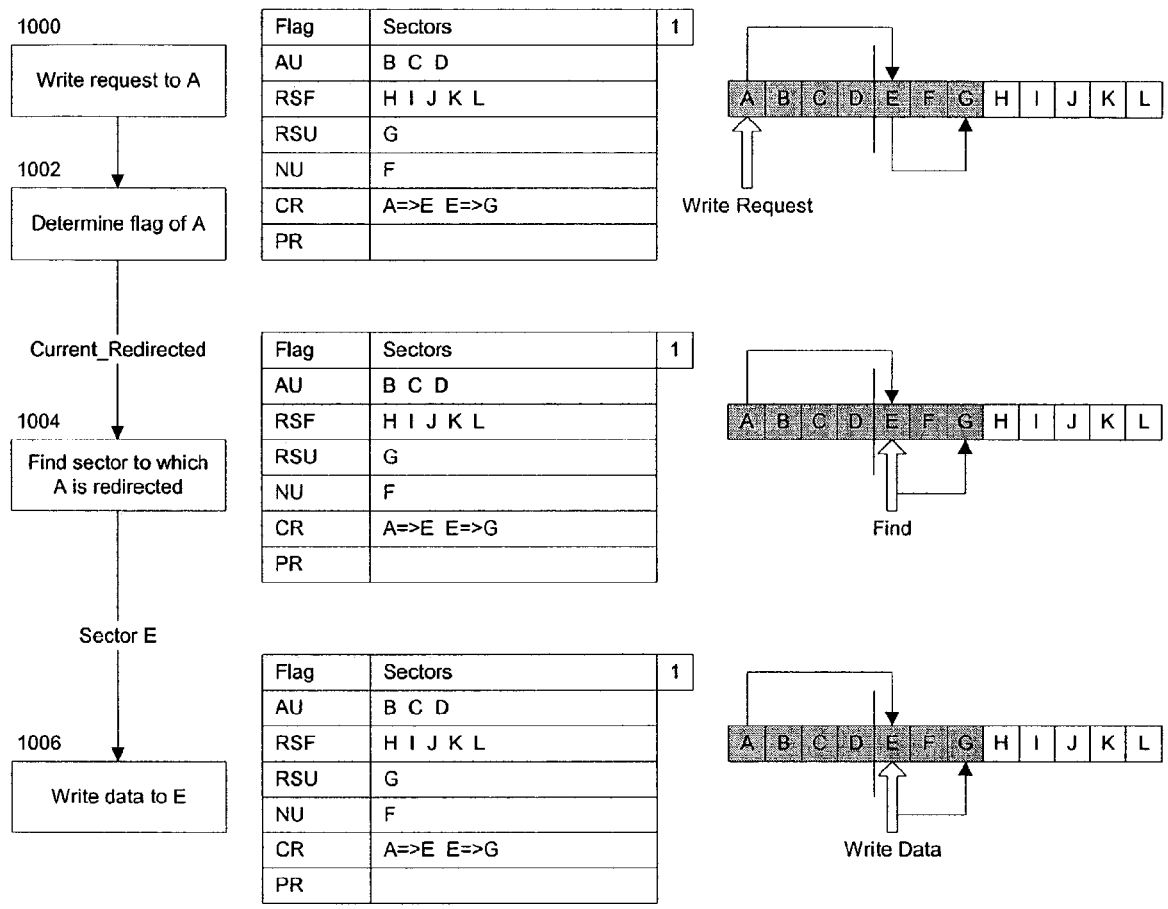
FIG. 10 is a diagram illustrating an embodiment of a process, matrix tables and sector representations associated with a write request from file system to a sector flagged as Current_Redirected.

FIG. 10 is a diagram illustrating an embodiment of a process, matrix tables and sector representations associated with a write request from file system 102 to a sector flagged as Current_Redirected. In step 1000 a write request to sector A is intercepted in the manner described above. In step 1002 the Writes_Module 124 refers to the working version of matrix table 1 and determines that sector A is flagged as Current_Redirected. In step 1004 the Writes_Module 124 determines from the working version of matrix table 1 the sector to which sector A is redirected, sector E. In step 1006 the data contained in the write request of step 1000 is written to sector E. Although sector E is itself redirected to sector G, a write request to sector A is redirected to sector E. A write request directly to sector E will be redirected to sector G. Sector E appears transparently to the file system 102 as sector A. Sector G also appears transparently to the file system as sector E, as discussed above.

Thus the data contained in sectors A-D are not overwritten after they are identified as containing data belonging to recovery data set 1 at recovery point 1. However, the computer system can operate as if they had been overwritten while preserving them for recovery purposes, because the redirections can be transparent to the file system.

The sector management system 150 also process read requests. Read requests are intercepted in the same manner as write requests by the RS BIOS filter 118 and the RS device driver 120 as discussed above. In some embodiments, the read requests from the file system 102 intercepted by the RS BIOS filter 118 or the RS device driver 120 can be processed by a Reads_Module 126. In other embodiments in which the present systems and methods are integrated into the operating system, the read requests, as well as the write requests, are more aptly described as being part of the normal read flow of the operating system rather than being intercepted as described above. The Reads_Module 126 redirects read requests to some sectors depending on their status flags in the matrix table associated with the current recovery point. Basically, all sectors are read directly, except those sectors flagged as Current_Redirected or Previous_Redirected. Read requests to these sectors are redirected according to its entry in the current matrix table. Previous_Redirected sectors will be discussed in further detail below with regard to subsequently identified recovery data sets at later recovery points.

Figures 11, 12:
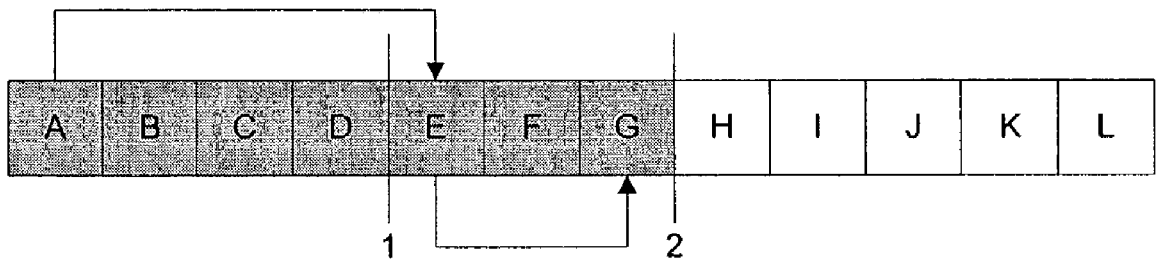
FIG. 11 is a diagram illustrating a representation of the aforementioned 12 sectors that indicates a new recovery data set, e.g., recovery data set 2, identified at a new recovery point, e.g., recovery point 2.
FIG. 12 is a diagram illustrating an embodiment of a second matrix table, e.g., matrix table 2, corresponding to recovery data set 2 of FIG. 11.

FIG. 11 is a diagram illustrating a representation of the aforementioned 12 sectors that indicates a new recovery data set, e.g., recovery data set 2, identified at a new recovery point, e.g., recovery point 2. As discussed above, in some embodiments of the invention, the Identify_Module 128 identifies a new set of recovery data, recovery data set 2, at recovery point 2, and creates the corresponding matrix table 2. The processes now described follow the example discussed in FIGS. 6-10. The recovery data identified as recovery data set 2 at recovery point 2 is stored in the sectors to the left of the vertical line between sectors G and H. At recovery point 2, sectors A-G are in use, while sectors H-L are free.

FIG. 12 is a diagram illustrating an embodiment of a second matrix table, e.g., matrix table 2, corresponding to recovery data set 2 of FIG. 11. The Identify_Module 128 creates the original version of matrix table 2 from the working version of matrix table 1 with the following algorithm:

| Flag in previous matrix table: | Flag in new matrix table: | |
|---|---|---|
| 1. Already_Used | Already_Used | (unchanged) |
| 2. RS_Free | RS_Free | (unchanged) |
| 3. RS_Used | RS_Used | (unchanged) |
| 4. Newly_Used | Already_Used | |
| 5. Current_Redirected | Previous_Redirected | |
| 6. Previous_Redirected | Previous_Redirected | (unchanged) |

Sectors that are flagged as Already_Used, RS_Free, RS_Used and Previous_Redirected in the working version of matrix table 1 remain unchanged in the original version of matrix table 2. Sectors flagged as Newly_Used in the working version of matrix table 1 are flagged as Already_Used in the original version of matrix table 2. For example, sector F is flagged as Already_Used in the original version of matrix table 2 because, at recovery point 2, sector F contains useful data written after the identification of recovery data set 1 and must also be protected. Sectors flagged as Current_Redirected in the working version of matrix table 1 are flagged as Previous_Redirected in the original version of matrix table 2. For example, sector A and its target sector E (represented as A=>E) are flagged as Previous_Redirected in the original version of matrix table 2, because a write request to sector A after the identification of recovery data set 2 should not be redirected to sector E, as sector E saves the data in sector A before the identification of recovery data set 2. This is discussed in more detail below. These steps ensure that the original version of matrix table 2 reflects the conditions of the hard disk sectors at recovery point 2.

Write requests to sectors marked as Already_Used, RS_Free, RS_Used, Newly_Used, and Current_Redirected have already been discussed with respect to matrix table 1 in FIGS. 6-10. Write requests from the file system 102 to these types of sectors after the identification of recovery data set 2 are handled in the same manner as was described with respect to FIGS. 6-10 using the working version of matrix table 2. Once a new matrix table is created, e.g., matrix table 2, reference is usually only made to an earlier matrix table, e.g. matrix table 1, when restoring the hard disk to the state reflected by the recovery data set associated with that earlier table. Therefore, the working version of matrix table 1 can be discarded and only the original version of matrix table 1 needs to be retained, for example, for recovery or restore purposes.

FIG. 13 is a diagram illustrating an embodiment of a process, matrix tables and sector representations associated with a write request from file system 102 to a sector flagged as Previous_Redirected, with respect to matrix table 2 shown in FIG. 12. At this point, the contents of both the original and the working versions of matrix table 2 are identical. In step 1300 a write request from the file system 102 to sector A is intercepted in the manner described above. In step 1302 the Writes_Module 124 determines from the working version of matrix table 2 that sector A is flagged as Previous_Redirected. In step 1304 the Writes_Module 124 finds a sector from the working version of matrix table 2 that is flagged as RS_Free, e.g., sector H. Sector H is then flagged as RS_Used in the working version of matrix table 2 in step 1306. In step 1308 the data contained in the write request of step 1300 is written to sector H. In step 1310 sector A is flagged as Current_Redirected in the working version of matrix table 2. In step 1312 the redirection from sector A to sector H is updated in the working version of matrix table 2. While the last four steps, steps 1306-1312, are illustrated in a particular order, they may actually be carried out in any order. Further read and write requests to sector A are also redirected to sector H.

Figures 14, 15:
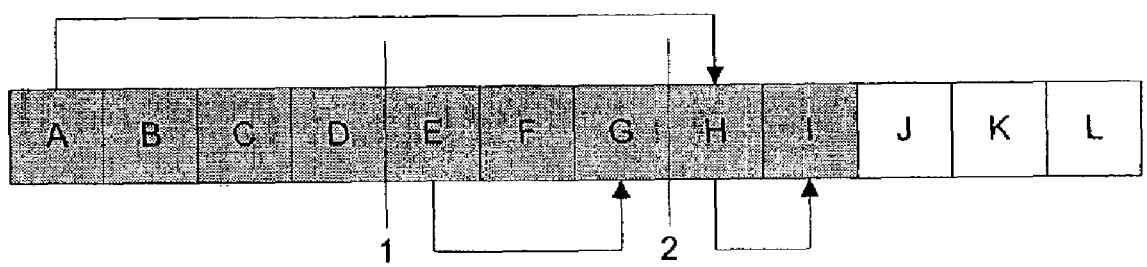
FIG. 14 is a diagram illustrating a representation of the 12 hard disk sectors with two identified recovery data sets.
FIG. 15 is a diagram illustrating an embodiment of the corresponding changes to the working version of matrix table 2 made by the Writes_Module after redirecting to sector I a write request from the file system to sector H as discussed above with regard to FIG. 14.

FIG. 14 is a diagram illustrating a representation of the 12 hard disk sectors with two identified recovery data sets. Recovery data set 1 includes the sectors to the left of line 1, and recovery data set 2 includes the sectors to the left of line 2. As sector H is now flagged as RS_Used, a write request from the file system 102 to sector H is handled just like the write request to sector E as described with respect to FIG. 8. A write request from the file system 102 to sector H is redirected by the Writes_Module 124 to sector I, as sector H is flagged as RS_Used in the working version of matrix table 2. This is represented by the arrow from sector H to sector I in FIG. 14.

FIG. 15 is a diagram illustrating an embodiment of the corresponding changes to the working version of matrix table 2 made by the Writes_Module 124 after redirecting to sector I a write request from the file system to sector H as discussed above with regard to FIG. 14. H is flagged as Current_Redirected and sector I is flagged as RS_Used in the working version of matrix table 2.

Figures 16, 17:
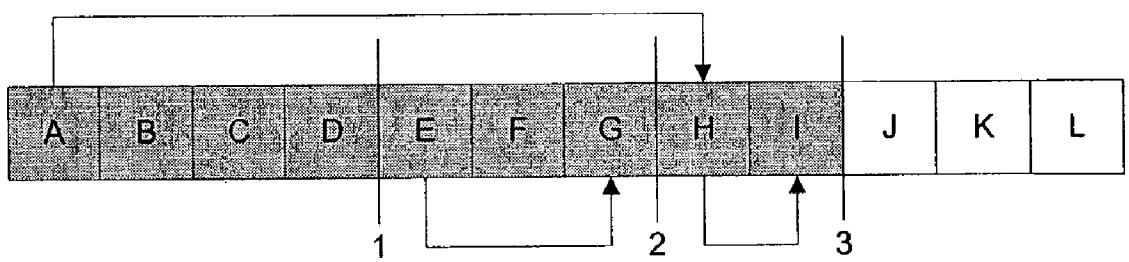
FIG. 16 is a diagram illustrating a representation of a new recovery data set, e.g., recovery data set 3, identified by the Identify_Module at recovery point 3.
FIG. 17 is a diagram illustrating an embodiment of a new matrix table, e.g., matrix table 3, created by the Identify_Module.

FIG. 16 is a diagram illustrating a representation of a new recovery data set, e.g., recovery data set 3, identified by the Identify_Module 128 at recovery point 3. Recovery data set 3 is delineated by the vertical line, line 3, between sectors I and J. FIG. 17 is a diagram illustrating an embodiment of a new matrix table, e.g., matrix table 3, created by the Identify_Module 128. Matrix table 3 is created using the process described above with respect to FIG. 12. Again, a copy of the matrix table 3 is saved as an original version, and the Writes_Module 124 and the Reads_Module 125 make changes to the working version of matrix table 3.

FIG. 16 represents the 12 hard disk sectors, A-L, after the Identify_Module has identified recovery data set 3 at recovery point 3. The corresponding new matrix table, matrix table 3, is illustrated in FIG. 17. The process of identifying a recovery data set and creating a corresponding new matrix table is discussed above with regard to FIG. 12. Once again, only sectors that are flagged as either Newly_Used or Current_Redirected are reflagged in the new matrix table, matrix table 3. There are no Newly_Used sectors in the working version of matrix table 2. The two Current_Redirected sectors in matrix table 2, A and H, are reflagged as Previous_Redirected in matrix table 3. Again, after these changes are made, an original copy of matrix table 3 is saved and the working version is used by the Writes Module 124.

FIG. 18 is a diagram illustrating a further representation of the 12 hard disk sectors with three identified recovery data sets. A write request from the file system 102 to sector J is represented by the hollow arrow on top of sector J. Write requests from the file system 102 to RS_Free sectors have already been discussed above with regard to FIG. 7. At this point, the contents of both the original and the working versions of matrix table 3 are identical. The Writes_Module 124 determines that sector J is flagged as RS_Free in matrix table 3 (as shown in FIG. 17), writes the data to sector J, and changes its flag to Newly_Used in the working version of matrix table 3 (as shown in FIG. 19).

FIG. 19 is a diagram illustrating an embodiment of a representation of the working version of matrix table 3 after the Writes_Module 124 processes the write request to sector J. As discussed above with regard to FIG. 18, the Writes_Module 124 has changed the flag of sector J from RS Free to Newly_Used in the working version of matrix table 3.

Restoring the hard disk to a state reflected by the data in a previously identified recovery data set will now be discussed. In certain embodiments, referring back to FIG. 1, the recovery algorithm can be implemented in and performed by a Recover_Module 130. Three sets of recovery data, recovery data sets 1-3, have been identified at recovery points 1-3, respectively, in the embodiments described thus far. In other embodiments, the Recover_Module 130 restores the hard disk to a state reflected by a previously identified recovery data set by identifying a new recovery data set and creating a corresponding new matrix table.

FIG. 20 is a diagram illustrating an embodiment of an overview of the newly identified recovery data set, e.g., recovery data set 4. Recovery data set 4 is identified at recovery point 4. At recovery point 4, sectors A-J are in use. These sectors are delineated by the vertical line marked 4(1). The (1) denotes that the sector management system 150 is restoring the hard disk to the state reflected by recovery data set 1.

FIG. 21 is a flowchart illustrating an embodiment of a process performed by the Recover_Module 130 to restore the hard disk to a state reflected by a previously identified recovery data set. In step 2100 the Recover_Module 130 identifies a new recovery data set n to restore the hard disk to the state reflected by a previously identified recovery data set a. In step 2102, the Recover_Module 130 creates the original version of the corresponding matrix table n by copying the original version of matrix table a. As discussed above, the original version refers to the contents of the matrix table, which reflects the state of the hard disk sectors at the identification of its corresponding recovery data set. In step 2104, the Recover_Module 130 compares the RS_Free sectors in matrix table n to the RS_Free sectors in the working version of matrix table n-1, the matrix table reflecting the then-current state of the hard disk. In step 2106, each RS_Free sector in matrix table n that is not also flagged as RS_Free in working version of matrix table n-1 is reflagged as Already_Used in matrix table n by the Recover_Module 130, because that means that such sector is actually in use.

FIG. 22 is a diagram illustrating in greater detail an embodiment of a process, matrix tables and sector representations associated with the embodiment shown in FIG. 20, with the Recover_Module 130 performing the process as discussed above with regard to FIG. 21. As in FIG. 20, the Recover_Module 130 identifies recovery data set 4 to restore the hard disk to the state reflected by recovery data set 1 in step 2200. Recovery data set 4 is delineated by the vertical line between sectors J and K, designated 4(1). In step 2202, the Recover_Module 130 creates the original version of matrix table 4 by copying the original version of matrix table 1. In the graphical representation of the 12 sectors in the rightmost column, sectors E-J lose the gray shading which indicates a sector in use, as they are flagged as RS_Free in the working version of matrix table 4. In step 2204, the Recover_Module 130 compares the RS_Free sectors in the working version of matrix table 4 to the RS_Free sectors in the working version of matrix table 3. (The working version of matrix table 3 is derived from FIG. 19.) In step 2206, each RS_Free sector in the working version of matrix table 4 that is not also flagged as RS_Free in matrix table 3 is reflagged as Already_Used in the working version of matrix table 4 by the Recover_Module 130. These are sectors E-J. Sectors E-J have already been used before the identification of recovery data set 4, and are not actually free. Once again, after the Recover_Module 130 creates the original version of matrix table 4 and performs the comparison against the working version of the previous matrix table (as well as any necessary changes), it saves the original version of matrix table 4, which reflects the state of the hard disk at the point in time at which recovery data set 4 is identified. If there are any further changes to the hard disk, the resulting changes are updated in the working version of matrix table 4.

Creating a new recovery point to recover to a previous recovery point uses more sectors than just going backwards to the target recovery point, canceling the redirection of redirected sectors, and deleting the now unnecessary sectors. However, creating a new recovery point to recover to a previous recovery point allows the redirections created in all the recovery points to be saved. This enables the sector management system 150 to restore to a later recovery point without any loss in information, e.g., restoring to recovery point 3 after recovering to recovery point 1. Restoring and recovering refer to going from an earlier recovery point to a later recovery point, as well as going from a later recovery point to an earlier recovery point. Therefore, while the systems and methods described herein generally refer to restoring as being from an earlier recovery point to a later recovery point, and recovering as being from a later recovery point to an earlier recovery point, this is for illustrative purposes only. Both restoring and recovering refer to altering the state or configuration of a computer system to a saved state or configuration, and thus do not necessarily have any chronological limitations.

FIG. 23 is a diagram illustrating an embodiment of a process, matrix tables and sector representations in which the Recover_Module 130 creates recovery point 5 to restore to recovery point 3 after creating recovery point 4 to recover to recovery point 1 as shown in FIG. 22. Conceptually, there is only a semantic difference between restoring and recovering, as recovery point 5 can be thought of as being created to recover to recovery point 3. In step 2300, the Recover_Module 130 creates recovery point 5 to recover to recovery point 3. This is represented by the vertical line between sectors J and K, designated recovery point 5(3). As the sector management system 150 has made no changes to matrix table 4 before the creation of matrix table 5, recovery point 5 and recovery point 4 lies on the same line. In step 2302, the Recover_Module 130 creates matrix table 5 by copying the original version of matrix table 3. The original version of matrix table 3 is illustrated in FIG. 17. In the graphical representation of the 12 sectors in the right column, sector J loses the gray shading which indicates a sector in use, as it is flagged as RS_Free in matrix table 5. In step 2304, the Recover Module 130 compares the RS Free sectors in matrix table 5 to the RS_Free sectors in the working version of matrix table 4. In step 2306, each RS_Free sector in matrix table 5 that is not also flagged as RS_Free in matrix table 4, e.g. sector J, is reflagged as Already_Used in matrix table 5 by the Recover_Module. This is sector J. Sector J has already been used in other recovery points, and is not actually free. Note that the arrows representing sector redirections created in recovery points 1-3 are present in the graphical representation of the 12 sectors, corresponding the Previous_Redirected sectors in matrix tables 3 and 5. This reflects the state of the hard disk at the creation of recovery point 3.

In the foregoing discussion, an original version and a working version of the matrix table 122, both corresponding to the same recovery point, have been discussed. In certain embodiments, the original version is saved to the hard disk 114 while the working version is stored in the RAM. After the creation of a new matrix table corresponding to a new recovery point, the working version of the previous matrix table corresponding to the previous recovery point may be erased or overwritten to save space. For example, as discussed above with regard to FIG. 22, when the Recover_Module 130 creates matrix table 4 when creating recovery point 4 to recover to recovery point 1, part of the process involves comparing RS_Free sectors with the working version of matrix table 3. After the comparison is performed and the newly created matrix table 4 is saved as an original version, the working version of matrix table 3 is no longer needed. Thus the sector management system 150 can overwrite the working version of matrix table 3 with the working version of matrix table 4. The working version of matrix table 3 is used to track changes after the creation of recovery point 4.

In further embodiments, the above described systems and methods are employed on a remote server computer that is accessible via a network. In these embodiments, the system is configured similarly to that shown in FIG. 1 where the computer system 10 is a server computer. In certain embodiments, the server computer includes a higher level of software that performs additional functionality typically allocated to server computers, e.g., servicing memory access, controlling memory requests and resolving memory conflicts. In systems having, for example, specialized memory devices such as Advanced Technology Attachment (ATA) devices or Redundant Array of Independent Disks (RAID), the system takes into account additional considerations, e.g., data striping or disk mirroring.

In addition to creating recovery states, as illustrated and described in relation to at least FIGS. 11, 16, 20 and 23, the sector management system 150 is additionally configured to delete or remove one or more saved recovery points. In the case where the recovery point to be removed is the most recently saved recovery point, e.g., the last recovery point, the recovery point can be removed by deleting the associated matrix table. For example, referring to FIG. 16, recovery point 3 (the most recently saved recovery point in FIG. 16) could be removed by deleting the matrix table for recovery point 3, which is shown in FIG. 17. In this example, after the removal of recovery point 3, two recovery points would remain, namely recovery point 1 and recovery point 2. Upon removal of a saved recovery point, the memory locations used by the matrix table can be released or freed up and made available for other use by the computer system. In addition, memory locations that are no longer needed due to the removal of the recovery point can also be released for other use. This is discussed in greater detail below.

For the cases where the recovery point to be removed is not the most recently saved recovery point, e.g., removing an intermediate recovery point for which there is at least one prior recovery point and at least one subsequent recovery point, one or more additional steps may be performed. For example, in addition to removing the matrix table associated with the recovery point as described above, the matrix table associated with the recovery point to be removed may be compared to the matrix table associated with the first recovery point and the matrix table associated with the last recovery point. If the matrix tables associated with the first and last recovery points do not contain an entry, e.g., a memory location such as a disk sector, that is in the intermediate recovery point, the intermediate recovery point can be removed by deleting the associated matrix table as well as the data stored in the memory location.

To illustrate by way of specific example, suppose that recovery points 1, 2 and 3 have been saved and recovery point 2 is to be removed. In this example, the matrix tables associated with recovery points 1, 2 and 3 are as follows:

Recovery point 1
  Already_Used: A B C
Recovery point 2
  Already_Used: C
  Current_Redirected: A B
  RS_Used: E F
Recovery point 3
  Already_Used: B
  Current_Redirected: A C
  RS_Used: E G If any memory locations that are used in the recovery point being removed are not used in the other recovery points, these memory locations can be released. In the present example, before removing the matrix table associated with recovery point 2, it is compared with the matrix tables associated with recovery points 1 and 3. Here, sector A is used in recovery point 2, as indicated by its Current_Redirected status in the matrix table. Since sector A is also used in recovery points 1 and 3, as indicated by its Already_Used and Current_Redirected status, respectively, sector A is not released. Similarly, sectors B and C are not released.

Sector F is also used in recovery point 2, as indicated by its RS_Used status. However, sector F is not present in the matrix table for recovery points 1 and 3. Therefore, sector F is not needed after the removal of recovery point 2, and the memory space used by sector F can be released and made available for other use by the computer system (as described below). However, since sectors E and G are marked as RS_Used in the matrix table for recovery point 3, they are not released when recovery point 2 is removed.

As noted in the above examples, when memory locations are no longer needed due to the removal of a recovery point, the memory may be released and made available for other use by the computer system. Memory can be released, for example, by altering the FAT table to indicate that the memory is no longer used by the system. As a further example, memory locations may be released by invoking an interface of the operating system, such as an application program interface (API), that performs operating system instructions that cause the memory to be identified as available for use by the system. In addition to releasing memory locations that are no longer used by the sector management system 150, removing a recovery point is also beneficial in that the memory used to store the matrix table itself may be released, such that this released memory is then available for other use by the computer system.

While the above description of the sector management system has included various embodiments in which the storage and retrieval of recovery points or sector states has been initiated by the pressing of certain function keys on a computer keyboard, other embodiments utilize different mechanisms. For example, the sector management system may initiate the storage or retrieval of sector states at a specific time of day or on a specific date, for example, by utilizing the timer functionality available on many computer systems. Several examples of timer events that may be utilized include the time counting down to a zero value, or counting up to a pre-determined value.

In addition, the storage or retrieval of sector states may be initiated upon the satisfying of one or more pre-determined conditions or upon the occurrence of one or more events. A pre-determined condition is a condition or event that is identified and selected prior to the occurrence of the condition or event. For example, the sector management system may be configured to automatically store a recovery point when a new software application is loaded onto the computer system or when a new revision of the operating system or software application is installed onto the computer system. As an additional example, the system may be configured to automatically retrieve a recovery state upon the occurrence of a certain system error or the detection of corrupted data that may cause operating system or application program errors.

Additional embodiments utilize the recovery points as configurations of the computer system using the systems and methods previously described. Thus, the sector management systems can be utilized to implement configuration management features to switch between various versions of the operating system, operating environment, application programs, test version configurations, or releasable levels of the computer system.

Configuration management features include version control capabilities to switch between certain configuration states (stored as recovery points) depending on the version of the operating system or application program that is desired for a computer system or user. This typically occurs when the system is booted or the user logs on. In other words, various configuration states may be stored as recovery points that correspond to particular operating system, operating environment, or application program versions. For example, a recovery point 1 can represent the Windows 98 version of the operating system, a recovery point 2 can represent the Windows ME version of the operating system, and a recovery point 3 can represent the Windows NT version of the operating system. Similarly, recovery points can correspond to various test configurations or test versions for users that utilize features of the sector management system 150 to control or manage various versions of the operating environment while performing test procedures.

In the embodiments in which the enterprise manager functionality is utilized on a remote computer system, the various operating system or application program versions may exist on the remote computer system, and be updated or downloaded to the computer system being logged on to via the network. The sector management system also allows the comparison of the version of a file corresponding to a certain recovery state with another version of the file corresponding to a different recovery state.

The sector management system is further capable of storing and retrieving recovery states that correspond to releasable levels of the operating system or application programs. For example, a user can store a first computer state, load a new version of a particular application program, store a second computer state, load an update to the operating system, store a third computer state, load a new version of another application program, and store a fourth computer state. If it is discovered that the new or updated versions of the application programs or operating system causes, for example, errors, unpredictable behaviors, or crashes of the computer system, the user can back out the update(s) by restoring to a previous, known working version of the computer system.

The sector management system additionally includes security features, for example, that cause the computer system to be inoperable when accessed by an unauthorized user. For example, different recovery points or sector states may have different protection criteria for restricting access to protected partitions or sectors. Thus, some recovery states may allow access to certain partitions by a particular user, while other recovery states may not allow access to the same partition by a different user. In addition, recovery states may include password information, so that passwords that have been changed, for example, without proper authorization, may be restored to the previous valid password by recovery to a state prior to the unauthorized change.

Other security features of the sector management system include the capability to configure the computer system to crash upon access by an unauthorized user, such as in the case of the physical theft of the computer system. For example, the sector management system may be configured to have a recovery state that causes the computer system to be inoperable, and to retrieve the inoperable recovery state upon unauthorized access so that the computer system becomes inoperable. In this case, the computer system can be recovered by restoring to a pre-crash state, after entry of an authorized password. The security features described above are optional and configurable, however, as the sector management system also can execute in a non-secure mode, or various levels of security in which certain security features may be selectively turned on or off. For example, in a non-secure mode of operation, any user can remove existing recovery points, any user can store new recovery points, and any user can retrieve any recovery points. In other example, only certain users are authorized to add, remove and retrieve certain recovery point. As an illustration, one user may not be able to retrieve recovery points stored by any other user or by other users in a different group.

The sector management system can additionally include various multi-user or multi-project system features. Examples of multi-user features include the capability to switch to certain recovery states depending on the particular user that has logged on. In this way, the state of the computer system can be different for different users or classes of users, and is transparent to the user. For example, recovery points can be stored that correspond to a specific user, such that when the user logs in to the computer system, the recovery point corresponding to the user's specific computer system configuration can be retrieved. In addition, groups of users can be assigned certain attributes, for example, users that work in a particular department or on a particular project, such that recovery points can be automatically retrieved when any one of the users in the group logs in. In addition, the sector management system can switch to project-specific recovery states, according to the project that the particular user is assigned to, or if logins are specific to a particular project (such as users working on Project Alpha who access the computer system using a specific Project Alpha login, and a recovery state is restored that configures the system for use by Project Alpha users). Thus, computer systems can be configured with multiple profiles to provide project partitioning and support for a number of various project configurations. Still further, computer systems can be configured as shared systems that provide a separate state for each of a multitude of operators to enable a shift operation capability, for example, three shift operators can share a single computer system.

The sector management system additionally provides the capability to view and/or recapture data and/or files as they existed in a recovery point. For example, a user of the computer system may save two recovery points, for example, recovery point 1 and recovery point 2. After restoring the computer system to recovery point 1, the user can copy various data files as they existed in recovery point 2. The saved recovery point 2 can be accessed by creating or mounting a virtual drive, for example, by invoking an interface to the operating system such as an application program interface (API). For example, the Windows 2000 operating system includes such an API. That API creates a read only virtual drive based upon provided memory locations. Therefore, the sector management system provides the list of memory locations which corresponds to recovery point 2 to the API. The API then generates the virtual drive. Files located on the virtual drive can be read and copied. Alternatively, the sector management system can include a module to perform this function.

The data files can then be copied from the virtual drive to the active operating environment. By creating a virtual drive, certain data stored on the memory or hard disk can appear to the operating system as a separate device, although it is in fact physically located on the memory or hard disk. A virtual drive is typically a read only device, in that data can be read from a virtual drive but data may not be written or copied to the virtual drive. Once the desired data files are copied into the current operating environment, the virtual drive may be deleted or dismounted, after which the drive is no longer visible to the operating system and the data contained therein is not readily accessible.

The sector management system also allows for faster scanning and recovery after a computer virus, worm, or other program or piece of computer code that is loaded onto a computer system without the user's knowledge and runs against the user's wishes, usually in a destructive or malicious manner. After such a virus or worm is detected, the user or a system operator typically executes a virus scanning program to check all or a substantial number of the files on the computer system for the presence or infection of the virus or worm. However, where computer states have been saved using the sector management system as described above, the virus scanning program would only need to check the sectors that have been modified after the virus was detected. The files or sectors modified prior to the infestation of the virus or worm would not be affected and thus would not need to be scanned. This feature could potentially speed up, sometimes by a significant amount, the time required to scan the computer system for presence of a virus or worm.

While the above detailed description has shown, described, and pointed out novel features of the invention as applied to various embodiments, it will be understood that various omissions, substitutions, and changes in the form and details of the device or process illustrated may be made by those of ordinary skill in the technology without departing from the spirit of the invention. This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method for accessing a group of memory locations in a computer system, the method comprising:

maintaining, for said group of memory locations, a first data structure that has a plurality of entries, the plurality of entries including one or more entries dedicated to each memory status type in a set of two or more memory status types, wherein the one or more entries dedicated to a given memory status type include an indication of any and all memory locations in said group of memory locations that currently have a status corresponding to the given memory status type;

receiving a write request to a first memory location within said group of memory locations;

reading from a first group of one or more entries within said first data structure to determine whether said first memory location is indicated as having a protected memory status, wherein the first group of one or more entries are dedicated to one or more memory status types indicative of a protected memory status; and redirecting said write request to a second memory location if said one or more entries indicate that said first memory location has a protected memory status, wherein said redirecting preserves the contents of the first memory location for a first recovery point.

2. The method of claim 1, further comprising redirecting a read request to said first memory location to said second memory location, wherein the contents of said second memory location are returned in response to said read request to said first memory location.

3. The method of claim 1, wherein the group of memory locations is accessed via a network.

4. The method of claim 1, wherein said first memory location has a protected memory status, and wherein said first memory location includes operating system data of the computer system.

5. The method of claim 1, wherein said first recovery point corresponds to a configuration of the computer system.

6. The method of claim 1, further comprising:
redirecting a subsequent write request to said second memory location to a third memory location such that the contents of said second memory location are preserved for a second recovery point.

7. The method of claim 6, further comprising redirecting a read request to said second memory location to said third memory location, wherein the contents of said third memory location are returned in response to said read request to said second memory location.

8. The method of claim 1, further comprising establishing said first recovery point.

9. The method of claim 8, wherein said first data structure is maintained after said establishing said first recovery point.

10. The method of claim 9, further comprising establishing a second recovery point subsequent to said first recovery point, wherein said establishing said second recovery point includes saving the contents of the first data structure and creating a second data structure.

11. The method of claim 1, wherein said first data structure has a first entry indicating one or more memory locations that have a first memory status type, wherein accesses to the one or more memory locations within the first entry are currently redirected to other memory locations.

12. The method of claim 11, wherein said one or more memory locations were added to said first entry after said first recovery point was established.

13. The method of claim 1, wherein said first data structure has a first entry indicating one or more memory locations that have a first memory status type, wherein accesses to the one or more memory locations in the first entry were previously redirected to other memory locations.

14. The method of claim 13, wherein said one or more memory locations indicated by the first entry are associated with recovery points established before said first recovery point.

15. The method of claim 1, wherein said first data structure has a first entry indicating one or more memory locations that have a protected memory status.

16. The method of claim 15, wherein said one or more memory locations indicated by the first entry were written before said first recovery point was established.

17. The method of claim 15, wherein said one or more memory locations indicated by the first entry were written after said first recovery point was established.

18. The method of claim 1, wherein said first data structure has a first entry indicating one or more memory locations that have a first memory status type, wherein the one or more locations indicated by said first entry were written after said first recovery point was established.

19. The method of claim 18, wherein said first memory status type is indicative of a non-protected memory status.

20. The method of claim 1, wherein said first data structure includes a first entry corresponding to a free memory status.

21. The method of claim 1, wherein the first data structure includes one or more entries indicative of protected memory locations and one or more entries indicative of non-protected memory locations.

22. The method of claim 21, wherein the one or more entries indicative of protected memory locations include a first set of entries dedicated to a first memory status type and a second set of entries dedicated to a second memory status type.

23. The method of claim 21, wherein each of the plurality of entries, if populated, includes information indicating memory locations having only the memory status type that the entry is dedicated to.

24. The method of claim 1, wherein the set of memory status types includes one or more types indicative of a protected memory status, and wherein the first data structure is arranged to permit a determination of any and all memory locations within the group of memory locations that currently have a status corresponding to a particular memory status type by accessing only those one or more entries dedicated to the particular memory status type.

25. A method of storing a group of memory locations in a computer system, the method comprising:
maintaining, for said group of memory locations, a first data structure that has a plurality of entries, the plurality of entries including one or more entries dedicated to each memory status type in a set of two or more memory status types, wherein the one or more entries dedicated to a given memory status type include an indication of any and all memory locations in said group of memory locations that currently have a status corresponding to the given memory status type;

selecting a first addressable memory location within said group of memory locations as part of a first recovery point, wherein said first memory location is indicated as having a protected memory status in said first data structure;

receiving a write request to said first addressable memory location; and redirecting said write request to a second addressable memory location within said group of memory locations.

26. The method of claim 25, further comprising redirecting a read request to said first addressable memory location to said second addressable memory location, thereby returning the contents of said second addressable memory location in response to said read request to said first addressable memory location.

27. The method of claim 25, wherein said first recovery point corresponds to a configuration of an operating system loaded on the computer system.

28. The method of claim 25, further comprising:
selecting said second addressable memory location as part of a second recovery point, wherein said second memory location is indicated as having a protected memory status in a second data structure; and redirecting a subsequent write request to said second addressable memory location to a third addressable memory location within said group of memory locations.

29. The method of claim 28, further comprising redirecting a read request to said second addressable memory location to said third addressable memory location, such that the contents of said third addressable memory location are returned in response to said read request to said second addressable memory location.

30. The method of claim 28, further comprising creating said second recovery point is in response to a timer event.

31. The method of claim 28, further comprising creating said second recovery point in response to pre-determined criteria.

32. The method of claim 25, wherein the set of memory status types includes one or more types indicative of a protected memory status, and wherein the first data structure is arranged to permit a determination of any and all memory locations within the group of memory locations that currently have a particular memory status type by accessing only those one or more entries dedicated to the particular memory status type.

33. A method of protecting a group of memory locations in a computer system from being overwritten, the method comprising:
  maintaining, for said group of memory locations, a first data structure that has a plurality of entries, the plurality of entries including one or more entries dedicated to each memory status type in a set of two or more memory status types, wherein the one or more entries dedicated to a given memory status type include an indication of any and all memory locations in said group of memory locations that currently have a status corresponding to the given memory status type;
  receiving a write request to a first memory location within said group of memory locations;
  reading from one or more entries within said first data structure to determine whether said first memory location is indicated as having a protected memory status, wherein the one or more entries are dedicated to one or more memory status types indicative of a protected memory status;
  redirecting said write request to a second memory location if said one or more entries indicate that said first memory location has a protected memory status;
  writing to a first entry within said first data structure to indicate that said second memory location has a protected memory status;
  redirecting a write request to said second memory location to a third memory location; and
  writing to a second entry within said first data structure to indicate that said second memory location has a protected memory status;
  wherein the set of memory status types includes two or more memory status types.

34. The method of claim 33, further comprising redirecting a read request to said first memory location to said second memory location, thereby returning the contents of said second memory location in response to said read request to said first memory location.

35. The method of claim 33, further comprising redirecting a read request to said second memory location to said third memory location, thereby returning the contents of said third memory location in response to said read request to said second memory location.

36. The method of claim 33, wherein the set of memory status types includes one or more types indicative of a protected memory status, and wherein the first data structure is arranged to permit a determination of any and all memory locations within the group of memory locations that currently have a status corresponding to a particular memory status type by accessing only those one or more entries dedicated to the particular memory status type.

37. A computer, comprising:
  a processor; and
  a memory coupled to the processor, wherein the memory stores instructions executable by the processor to:
    maintain a first data structure indicating the current memory status types of each of a group of memory locations, wherein the first data structure includes one or more entries dedicated to each memory status type in a set of two or more memory status types, wherein the one or more entries dedicated to a given memory status type include an indication of any and all memory locations in said group of memory locations that currently have a status corresponding to the given memory status type;
    receive one or more write requests to the group of memory locations;
    update said first data structure in response to the one or more write requests to the group of memory locations.

38. The computer of claim 37, wherein the group of memory locations is accessed via a network.

39. The computer of claim 37, wherein the first data structure includes one or more entries indicative of protected memory locations and one or more entries indicative of non-protected memory locations.

40. The computer of claim 39, wherein the one or more entries indicative of protected memory locations include a first set of entries dedicated to a first memory status type and a second set of entries dedicated to a second memory status type.

41. The computer of claim 39, wherein each of the plurality of entries, if populated, includes information indicating memory locations having only the memory status type that the entry is dedicated to.

42. The computer of claim 37, wherein the memory stores program instructions executable by the processor to:
  receive a write request to a first memory location within said group of memory locations;
  determine, from a first entry within the first data structure, whether said first memory location has a protected status;
  if said first memory location has a protected status, find, from a second entry within said first data structure, a second memory location that has a status of not used;
  update said first data structure so that a third entry indicates that said second memory location has a status of used;
  redirect said write request from said first memory location to said second memory location; and
  update said first data structure so that a fourth entry indicates that said first memory location is currently redirected to said second memory location.

43. The computer of claim 42, wherein the memory stores instructions executable by the processor to redirect a read request to said first memory location to said second memory location so that the contents of said second memory location are returned in response to said read request to said first memory location.

44. The computer of claim 37, wherein the set of memory status types includes one or more types indicative of a protected memory status, and wherein the first data structure is arranged to permit a determination of any and all memory locations within the group of memory locations that currently have a status corresponding to a particular memory status type by accessing only those one or more entries dedicated to the particular memory status type.

45. A method for creating a plurality of recovery points for a computer system having a group of memory locations, the method comprising:
   creating an initial data structure indicating an original state of said group of memory locations, wherein said initial data structure corresponds to an initial recovery point for said computer system;
   receiving information identifying a new recovery point for said computer system, wherein said new recovery point is subsequent in time to said initial recovery point;
   creating a new data structure corresponding to said new recovery point, wherein said creating includes using states of said group of memory locations indicated by said initial data structure to indicate states of said group of memory locations within said new data structure, and wherein said creating includes:
      if said initial data structure indicates that one or more of said group of memory locations were unused at said initial recovery point but in use at said new recovery point, indicating in said new data structure that said one or more memory locations are protected;
   wherein both said initial data structure and said new data structure have a plurality of entries, each of the data structures having one or more entries dedicated to each memory status type of a set of two or more memory status types, wherein the one or more entries dedicated to a given memory status type include an indication of any and all memory locations in said group of memory locations that currently have a status corresponding to the given memory status type.

46. The method of claim 45, wherein said information identifying the new recovery point is received from an enterprise manager executing on a remote computer system that is connected to the computer system via a network.

47. The method of claim 45, wherein said new recovery point is identified in response to a timer event.

48. The method of claim 45, wherein said new recovery point is identified in response to satisfaction of a predetermined condition.

49. The method of claim 45, wherein said protected memory locations contain operating system data of the computer system.

50. The method of claim 45, wherein said initial recovery points corresponds to an initial configuration of the computer system.

51. The method of claim 45, further comprising removing said initial recovery point, wherein said removing comprises deleting the initial data structure.

52. The method of claim 51, wherein said removing further comprises releasing memory locations of the deleted initial data structure and memory locations no longer needed after removal of said initial recovery point, wherein the released memory locations are made available for use by the computer system.

53. The method of claim 45, further comprising removing said new recovery point, wherein said removing comprises deleting the new data structure.

54. The method of claim 45, wherein the set of memory status types includes one or more types indicative of a protected memory status, and wherein both the initial and new data structures are arranged to permit a determination of any and all memory locations within the group of memory locations that currently have a status corresponding to a particular memory status type by accessing only those one or more entries dedicated to the particular memory status type.

55. A computer readable storage medium including program instructions for accessing a group of memory locations in a computer system, wherein said program instructions are executable to:
   maintain, for said group of memory locations, a first data structure that has a plurality of entries, the plurality of entries including one or more entries dedicated to each memory status type in a set of two or more memory status types, wherein the one or more entries dedicated to a given memory status type include an indication of any and all memory locations in said group of memory locations that currently have a status corresponding to the given memory status type;
   receive a write request to a first memory location within said group of memory locations;
   read from one or more entries within said first data structure to determine whether said first memory location is indicated as having a protected memory status, wherein the one or more entries are dedicated to one or more memory status types indicative of a protected memory status; and
   redirect said write request to a second memory location if said one or more entries indicate that said first memory location has a protected memory status, wherein said write request is redirected such that the contents of the first memory location are preserved for a first recovery point.

56. The computer readable storage medium of claim 55, the method further comprising redirecting a read request to said first memory location to said second memory location, thereby returning the contents of said second memory location in response to said read request to said first memory location.

57. The computer readable storage medium of claim 55, wherein said first memory location has a protected memory status, and wherein said first memory location includes operating system data of the computer system.

58. The computer readable storage medium of claim 55, further including program instructions executable to:
   redirect a subsequent write request to said second memory location to a third memory location such that the contents of said second memory location are preserved for a second recovery point.

59. The computer readable storage medium of claim 55, wherein the first data structure includes one or more entries indicative of protected memory locations and one or more entries indicative of non-protected memory locations.

60. The computer readable storage medium of claim 59, wherein the one or more entries indicative of protected memory locations include a first set of entries dedicated to a first memory status type and a second set of entries dedicated to a second memory status type.

61. The computer readable storage medium of claim 59, wherein each of the plurality of entries, if populated, includes information indicating memory locations having only the memory status type associated with that entry.

62. The computer readable storage medium of claim 55, wherein the set of memory status types includes one or more types indicative of a protected memory status, and wherein the first data structure is arranged to permit a determination of any and all memory locations within the group of memory locations that currently have a status corresponding to a particular memory status type by accessing only those one or more entries dedicated to the particular memory status type.

* * * * *